US012749003B2

(12) United States Patent

Feldman et al.

(10) Patent No.: US 12,749,003 B2

(45) **Date of Patent: *Sep. 29, 2026**

(54) USING CONTAINER INFORMATION TO SELECT CONTAINERS FOR EXECUTING MODELS

(71) Applicant: Salesforce, Inc., San Francisco, CA (US)

(72) Inventors: Yuliya L. Feldman, Campbell, CA (US); Seyedshahin Ashrafzadeh, Foster City, CA (US); Alexandr Nikitin, El Sobrante, CA (US); Manoj Agarwal, Cupertino, CA (US)

(73) Assignee: Salesforce, Inc., San Francisco, CA (US)

( * ) Notice: Subject to any disclaimer, the term of this patent is extended or adjusted under 35 U.S.C. 154(b) by 882 days.

This patent is subject to a terminal disclaimer.

(21) Appl. No.: 17/159,639

(22) Filed: Jan. 27, 2021

(65) Prior Publication Data

US 2022/0237505 A1 Jul. 28, 2022

(51) Int. Cl.

*G06N 20/00* (2019.01)
*G06F 9/455* (2018.01)

(Continued)

(52) U.S. Cl.

CPC ......... *G06N 20/00* (2019.01); *G06F 9/45558* (2013.01); *G06F 9/5077* (2013.01); *G06F 16/23* (2019.01); *G06F 2209/501* (2013.01)

(58) Field of Classification Search

CPC ... G06N 20/00; G06F 9/45558; G06F 9/5077; G06F 16/23; G06F 2209/501;

(Continued)

(56) References Cited

U.S. PATENT DOCUMENTS 5,577,188 A 11/1996 Zhu
5,608,872 A 3/1997 Schwartz (Continued)

OTHER PUBLICATIONS

Office Action (Non-Final Rejection) dated Mar. 19, 2024 for U.S. Appl. No. 17/159,805 (pp. 1-21).

(Continued)

*Primary Examiner* — Nicholas P Celani
*Assistant Examiner* — Wuji Chen
(74) *Attorney, Agent, or Firm* — Kwan & Olynick LLP

(57) ABSTRACT

Using container information to select containers for executing models is described. A system receives a request from an application and identifies a version of a machine-learning model associated with the request. The system identifies a set of each serving container corresponding to the machine-learning model from a cluster of available serving containers associated with the version of the machine-learning model. The system selects a serving container from the set of each serving container corresponding to the machine-learning model. If the machine-learning model is not loaded in the serving container, the system loads the machine-learning model in the serving container. If the machine-learning model is loaded in the serving container, the system executes, in the serving container, the machine-learning model on behalf of the request. The system responds to the request based on executing the machine-learning model on behalf of the request.

20 Claims, 6 Drawing Sheets

(51) Int. Cl.
*G06F 9/50* (2006.01)
*G06F 16/23* (2019.01)

(58) Field of Classification Search
CPC ... G06F 2009/45562; G06F 2009/4557; G06F 2009/45575
See application file for complete search history.

(56) References Cited

U.S. PATENT DOCUMENTS

| | | | |
|---|---|---|---|
| 5,649,104 | A | 7/1997 | Carleton |
| 5,715,450 | A | 2/1998 | Ambrose et al. |
| 5,761,419 | A | 6/1998 | Schwartz |
| 5,819,038 | A | 10/1998 | Carleton |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |
| 6,324,568 | B1 | 11/2001 | Diec et al. |
| 6,324,693 | B1 | 11/2001 | Brodersen et al. |
| 6,336,137 | B1 | 1/2002 | Lee et al. |
| D454,139 | S | 3/2002 | Feldcamp et al. |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu |
| 6,604,117 | B2 | 8/2003 | Lim et al. |
| 6,604,128 | B2 | 8/2003 | Diec |
| 6,609,150 | B2 | 8/2003 | Lee et al. |
| 6,621,834 | B1 | 9/2003 | Scherpbier |
| 6,654,032 | B1 | 11/2003 | Zhu |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans et al. |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu |
| 6,768,904 | B2 | 7/2004 | Kim |
| 6,772,229 | B1 | 8/2004 | Achacoso et al. |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 7,062,502 | B1 | 6/2006 | Kesler |
| 7,340,411 | B2 | 3/2008 | Cook |
| 7,356,482 | B2 | 4/2008 | Frankland et al. |
| 7,401,094 | B1 | 7/2008 | Kesler |
| 7,620,655 | B2 | 11/2009 | Larsson |
| 7,698,160 | B2 | 4/2010 | Beaven et al. |
| 7,730,478 | B2 | 6/2010 | Weissman |
| 7,779,039 | B2 | 8/2010 | Weissman et al. |
| 7,779,475 | B2 | 8/2010 | Jakobson et al. |
| 7,851,004 | B2 | 12/2010 | Hirao et al. |
| 8,010,663 | B2 | 8/2011 | Firminger et al. |
| 8,014,943 | B2 | 9/2011 | Jakobson |
| 8,015,495 | B2 | 9/2011 | Achacoso et al. |
| 8,032,297 | B2 | 10/2011 | Jakobson |
| 8,082,301 | B2 | 12/2011 | Ahlgren et al. |
| 8,095,413 | B1 | 1/2012 | Beaven et al. |
| 8,095,594 | B2 | 1/2012 | Beaven et al. |
| 8,209,308 | B2 | 6/2012 | Jakobson et al. |
| 8,275,836 | B2 | 9/2012 | Beaven et al. |
| 8,484,111 | B2 | 7/2013 | Frankland et al. |
| 8,490,025 | B2 | 7/2013 | Jakobson et al. |
| 8,504,945 | B2 | 8/2013 | Jakobson et al. |
| 8,510,664 | B2 | 8/2013 | Rueben et al. |
| 8,566,301 | B2 | 10/2013 | Rueben et al. |
| 8,646,103 | B2 | 2/2014 | Jakobson et al. |
| 9,926,131 | B1 * | 3/2018 | Lehmann ............. G06Q 10/083 |
| 10,509,648 | B2 * | 12/2019 | Rabin ........................ G06F 8/77 |
| 10,621,019 | B1 * | 4/2020 | Faulhaber, Jr. ..... G06F 9/45558 |
| 10,785,334 | B2 * | 9/2020 | Kristiansson ....... G06F 16/2255 |
| 10,812,366 | B1 * | 10/2020 | Berenberg .......... H04L 67/1097 |
| 10,931,786 | B1 * | 2/2021 | Vasquez .............. H04L 41/0806 |
| 11,055,273 | B1 * | 7/2021 | Meduri ............... G06F 16/2358 |
| 11,151,467 | B1 * | 10/2021 | Shtein ....................... G06N 7/00 |
| 11,200,204 | B2 * | 12/2021 | Wang .................... G06F 16/128 |
| 11,272,164 | B1 * | 3/2022 | Xing ........................ G06F 9/445 |
| 11,341,605 | B1 * | 5/2022 | Singh .................. H04L 67/1095 |
| 11,429,893 | B1 * | 8/2022 | Tong ...................... G06N 20/00 |
| 11,487,942 | B1 * | 11/2022 | Senthivel .............. G06F 40/295 |
| 11,537,439 | B1 * | 12/2022 | Liberty ................. G06F 9/5077 |
| 11,550,614 | B2 * | 1/2023 | Faulhaber, Jr. ..... G06F 9/45558 |
| 11,652,769 | B2 * | 5/2023 | Weiss ...................... H04L 51/10 709/206 |
| 11,775,867 | B1 * | 10/2023 | Jamei ...................... H04L 63/10 706/12 |
| 11,853,401 | B1 * | 12/2023 | Nookula ............. G06F 18/2163 |
| 2001/0044791 | A1 | 11/2001 | Richter et al. |
| 2002/0072951 | A1 | 6/2002 | Lee et al. |
| 2002/0082892 | A1 | 6/2002 | Raffel |
| 2002/0129352 | A1 | 9/2002 | Brodersen et al. |
| 2002/0140731 | A1 | 10/2002 | Subramanian et al. |
| 2002/0143997 | A1 | 10/2002 | Huang et al. |
| 2002/0162090 | A1 | 10/2002 | Parnell et al. |
| 2002/0165742 | A1 | 11/2002 | Robbins |
| 2003/0004971 | A1 | 1/2003 | Gong |
| 2003/0018705 | A1 | 1/2003 | Chen et al. |
| 2003/0018830 | A1 | 1/2003 | Chen et al. |
| 2003/0066031 | A1 | 4/2003 | Laane et al. |
| 2003/0066032 | A1 | 4/2003 | Ramachandran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker et al. |
| 2003/0120675 | A1 | 6/2003 | Stauber et al. |
| 2003/0151633 | A1 | 8/2003 | George et al. |
| 2003/0159136 | A1 | 8/2003 | Huang et al. |
| 2003/0187921 | A1 | 10/2003 | Diec et al. |
| 2003/0189600 | A1 | 10/2003 | Gune et al. |
| 2003/0204427 | A1 | 10/2003 | Gune et al. |
| 2003/0206192 | A1 | 11/2003 | Chen et al. |
| 2004/0001092 | A1 | 1/2004 | Rothwein et al. |
| 2004/0015981 | A1 | 1/2004 | Coker et al. |
| 2004/0027388 | A1 | 2/2004 | Berg et al. |
| 2004/0128001 | A1 | 7/2004 | Levin et al. |
| 2004/0186860 | A1 | 9/2004 | Lee et al. |
| 2004/0193510 | A1 | 9/2004 | Catahan et al. |
| 2004/0199489 | A1 | 10/2004 | Barnes-Leon et al. |
| 2004/0199536 | A1 | 10/2004 | Barnes-Leon et al. |
| 2004/0249854 | A1 | 12/2004 | Barnes-Leon et al. |
| 2004/0260534 | A1 | 12/2004 | Pak et al. |
| 2004/0260659 | A1 | 12/2004 | Chan et al. |
| 2004/0268299 | A1 | 12/2004 | Lei et al. |

(56) References Cited

U.S. PATENT DOCUMENTS

2005/0050555 A1 3/2005 Exley et al.
2005/0091098 A1 4/2005 Brodersen et al.
2009/0063415 A1 3/2009 Chatfield et al.
2009/0100342 A1 4/2009 Jakobson
2009/0177744 A1 7/2009 Marlow et al.
2012/0208501 A1* 8/2012 Tsuda ................ H04M 1/72403 455/411
2012/0233137 A1 9/2012 Jakobson et al.
2013/0047203 A1* 2/2013 Radhakrishnan ..... G06F 21/577 726/1
2013/0218948 A1 8/2013 Jakobson
2013/0218949 A1 8/2013 Jakobson
2013/0218966 A1 8/2013 Jakobson
2013/0247519 A1* 9/2013 Clark ...................... B65B 59/02 53/452
2013/0330020 A1* 12/2013 Thakkar .............. G06F 16/2291 382/305
2014/0082131 A1* 3/2014 Jagtap ................... G06F 9/5027 709/217
2014/0359537 A1 12/2014 Jakobson et al.
2015/0007050 A1 1/2015 Jakobson et al.
2015/0095162 A1 4/2015 Jakobson et al.
2015/0172563 A1 6/2015 Jakobson et al.
2015/0379429 A1* 12/2015 Lee .......................... G09B 5/00 706/11
2015/0379430 A1* 12/2015 Dirac ..................... G06N 20/00 706/12
2016/0078361 A1* 3/2016 Brueckner .............. H04L 67/10 706/12
2016/0269318 A1* 9/2016 Su ......................... H04L 47/785
2016/0330277 A1* 11/2016 Jain ..................... H04L 67/1095
2017/0063722 A1* 3/2017 Cropper ................ G06F 16/285
2017/0344910 A1* 11/2017 Wu ........................ G06N 20/00
2018/0089592 A1* 3/2018 Zeiler .................... G06N 20/00
2018/0152534 A1* 5/2018 Kristiansson ........... H04L 67/56
2018/0176070 A1* 6/2018 Shafiee ................. G06F 9/5083
2018/0219959 A1* 8/2018 Bugenhagen ......... H04L 41/083
2018/0278680 A1* 9/2018 Liu ....................... H04L 67/563
2018/0349191 A1* 12/2018 Dorsey ................. G06F 9/5044
2018/0357047 A1* 12/2018 Brown ................... G06N 3/082
2019/0102206 A1* 4/2019 Fichtenholtz ....... G06F 9/44505
2019/0155633 A1* 5/2019 Faulhaber, Jr. .......... G06N 5/04
2019/0156244 A1* 5/2019 Faulhaber, Jr. ........ G06N 20/00
2019/0156247 A1* 5/2019 Faulhaber, Jr. .......... G06N 3/08
2019/0279114 A1* 9/2019 Deshpande ............ G06N 20/00
2019/0327259 A1* 10/2019 DeFelice ............. H04L 63/1433
2020/0167202 A1* 5/2020 Huang ............... G05B 13/0265
2020/0272920 A1* 8/2020 Liu ........................ G06N 5/043
2020/0311617 A1* 10/2020 Swan .................... G06F 9/5077
2020/0322263 A1* 10/2020 Wu ....................... H04L 47/828
2021/0026703 A1* 1/2021 Fichtenholtz ....... G06F 9/44505
2021/0055977 A1* 2/2021 Lisuk .................. G06F 9/45558
2021/0073736 A1* 3/2021 Alawi .................. G06Q 10/105
2021/0081313 A1* 3/2021 Jang ...................... G06F 3/0608
2021/0144517 A1* 5/2021 Guim Bernat ...... H04L 41/0843
2021/0150411 A1* 5/2021 Coenders ............ G06F 21/6209
2021/0174238 A1* 6/2021 Song ................... G06F 16/2465
2021/0319360 A1* 10/2021 Vishnoi .................. G06N 3/006
2021/0342193 A1* 11/2021 Anand .................. G06F 9/5077
2022/0075610 A1* 3/2022 Wang ........................ G06F 8/63
2022/0083363 A1* 3/2022 Lewis ..................... H04L 67/34
2022/0083389 A1* 3/2022 Poothia ................. G06F 9/5027
2022/0172100 A1* 6/2022 Balasubramanian ........................ G06T 7/0008
2022/0179661 A1* 6/2022 Kim ........................ G06F 9/445
2022/0237505 A1* 7/2022 Feldman ............. G06F 9/45558
2022/0237506 A1* 7/2022 Feldman ............. G06F 9/45558
2022/0246303 A1* 8/2022 Sakaguchi .............. G06F 13/00
2022/0255731 A1* 8/2022 Modica ................... H04L 9/085
2022/0261270 A1* 8/2022 Gizis ................... H04L 63/0281
2022/0300754 A1* 9/2022 Biswas ................. G06F 18/285
2022/0318647 A1* 10/2022 Ashrafzadeh ............ G06N 5/04
2022/0382539 A1* 12/2022 Gumashta .............. G06N 20/00
2022/0382601 A1* 12/2022 Feldman ............... G06F 9/5083
2022/0383150 A1* 12/2022 Le .......................... G06N 20/00
2022/0391747 A1* 12/2022 Ashrafzadeh .......... G06N 20/00
2022/0391748 A1* 12/2022 Nikitin .................... H04L 67/51
2022/0391749 A1* 12/2022 Feldman ................... G06F 8/60
2022/0414547 A1* 12/2022 Ashrafzadeh ........... G06F 18/29
2022/0414548 A1* 12/2022 Ashrafzadeh ........... G06F 18/25
2023/0059339 A1* 2/2023 Rangarajan ............... G06F 8/61
2023/0074530 A1* 3/2023 Rigamonti .............. H04L 45/42
2023/0093963 A1* 3/2023 Kumar .................... H04L 41/16 370/252
2023/0110057 A1* 4/2023 Kan ...................... G06F 16/258 707/723
2023/0111775 A1* 4/2023 Lee ........................ G06N 20/00 706/12
2023/0222783 A1* 7/2023 Bowman ................ G06V 20/56 382/104
2023/0273837 A1* 8/2023 Fong .................... G06F 9/5072 718/1
2023/0300686 A1* 9/2023 Pantelidou ........ H04W 36/0033 370/331
2023/0306314 A1* 9/2023 Chandrasekaran .... G06N 20/20
2023/0325258 A1* 10/2023 Wang .................. H04L 41/0897 718/105
2023/0376167 A1* 11/2023 Imam .................. G06F 3/04847
2023/0385692 A1* 11/2023 Kang ..................... G06N 20/00
2024/0022927 A1* 1/2024 Tong ....................... H04W 4/40
2024/0143807 A1* 5/2024 Singh .................. G06F 21/6218
2025/0173183 A1* 5/2025 Trikande ............... G06F 9/5027

OTHER PUBLICATIONS

Office Action (Final Rejection) dated Jul. 2, 2024 for U.S. Appl. No. 17/159,805 (pp. 1-53).
U.S. Appl. No. 17/159,805, USPTO e-Office Action: CTNF—Non-Final Rejection, Jan. 21, 2025, 39 pages.
Office Action (Non-Final Rejection) dated May 1, 2025 for U.S. Appl. No. 17/159,805 (pp. 1-40).
Office Action (Final Rejection) dated Aug. 7, 2025 for U.S. Appl. No. 17/159,805 (pp. 1-23).
U.S. Appl. No. 17/159,805, USPTO e-Office Action: NOA—Notice of Allowance, Mar. 4, 2026, 18 pages.

* cited by examiner

USING CONTAINER INFORMATION TO SELECT CONTAINERS FOR EXECUTING MODELS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

Operating-system-level virtualization, also known as containerization, refers to an operating system feature in which an operating system kernel enables the existence of multiple isolated user-space instances. Each of these instances, also referred to as software containers, partitions, or virtualization engines, can wrap an executing application in a complete environment containing everything that the application needs, such as memory, disk space, network access, and an operating system. Software containers are used by machine-learning serving infrastructures, which are becoming ubiquitous in the emerging machine-learning industry as well as in public cloud computing services. Existing machine-learning serving infrastructures typically provide machine-learning models' services through a one-to-one relationship, by dedicating each individual serving container to hosting only one corresponding machine-learning model and all its required dependencies.

An application can be a computer program or piece of software designed and written to fulfill a particular purpose of a user. A serving container can be an isolated computer program execution environment that is enabled by a computer's operating system, and which executes the main functionality of a machine-learning model. A machine-learning model can be a computer system that scientifically studies algorithms and/or statistical models to perform a specific task effectively by relying on patterns and inference instead of using explicit instructions. A routing container can be an isolated computer program execution environment that is enabled by a computer's operating system, and which executes load-balancing code to direct requests for execution by machine-learning models. A request can be an instruction to a computer to provide information or perform another function.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
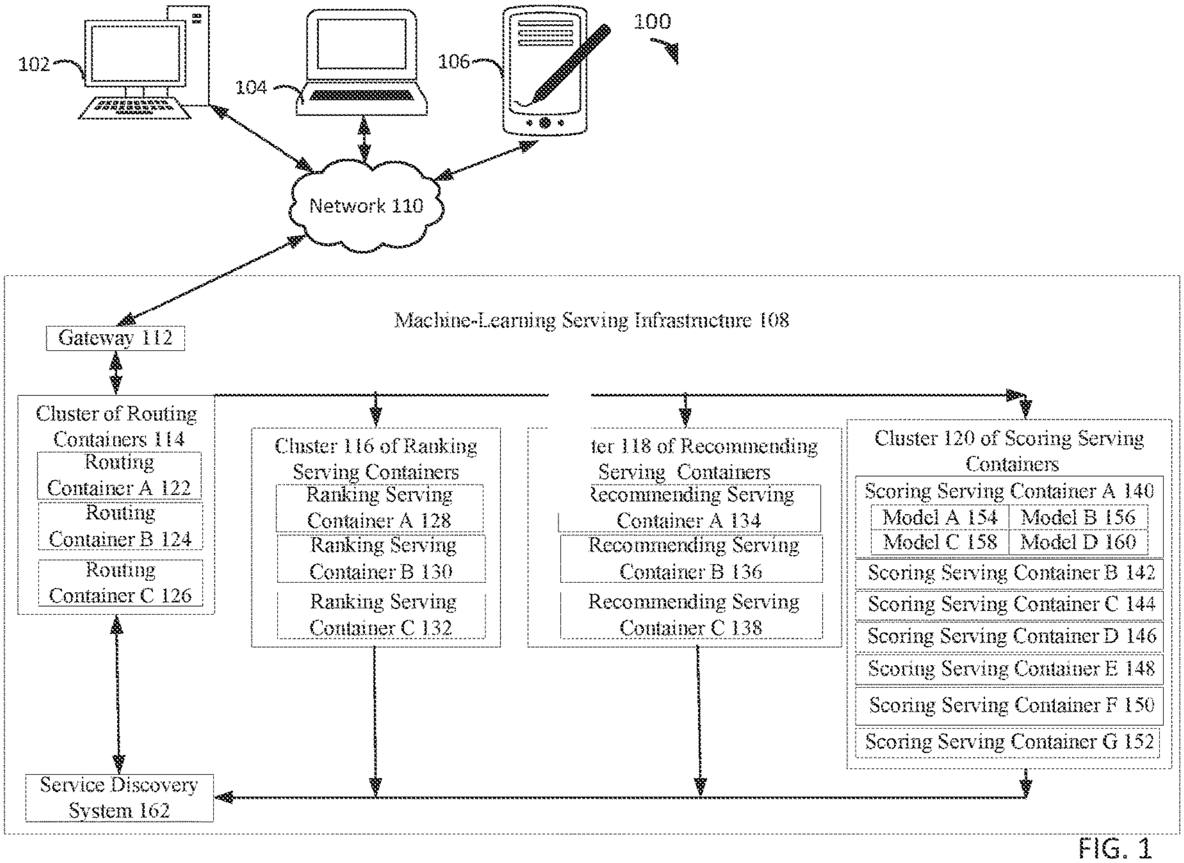
FIG. 1 illustrates a block diagram of an example system for using container information to select containers for executing models, under an embodiment.

Automated machine-learning, feature engineering, and training enables a multi-tenancy approach to serving containers hosting machine-learning models, such that a single serving container can host hundreds of machine-learning models for multiple tenants. Within a multitenant architecture, an instance of a software application is designed to provide every tenant with a dedicated share of the instance—including its data, configuration, user management, and tenant individual properties and functionality.

A tenant can be a group of users who share a common access with specific privileges to a software architecture in which a single instance of software serves multiple such groups. A cluster can be a group of similar entities. A cluster of serving containers can be a group of duplicates of an isolated computer program execution environment that is enabled by a computer's operating system, and which executes the main functionality of a machine-learning model for all tenants.

Each routing container, or cluster of routing containers, can authenticate any requesting tenant, and then route any tenant's request for a service by machine-learning models to any serving container in a cluster of serving containers. A machine-learning serving infrastructure can include multiple clusters of serving containers, with each cluster serving a different version of any type of machine-learning model. For example, three clusters of serving containers serve versions 5.7, 5.8, and 5.9 of the type of machine-learning models that generate scores of business opportunities, and one cluster of serving containers serves a new version 1.0 of a different type of machine-learning models that generate recommendations of business opportunities. Each cluster of serving containers can use lazy caching to cache each of its machine-learning models onto all its serving containers. A version can be a form of an entity that differs in certain respects from an earlier form or other forms of the same type of entity.

A cluster of serving containers that can host all machine-learning models of the same version for all tenants is limited by the number of these machine-learning models that a single serving container can hold. Therefore, scaling to accommodate future additions of machine-learning models may become a problem when these machine-learning models exceed the capacity of any individual serving container in the cluster. Since each machine-learning model's size, ranging from hundreds of kilobytes (KB_ to hundreds of megabytes (MB), initialization time, and number of requests can vary widely based on each tenant's underlying database, some clusters of serving containers may be limited by a scarcity of supporting resources, while other clusters of serving containers may have a surplus of supporting resources. The failure or the addition of any container in a cluster of serving containers can create the need to rebalance the supporting resources in the clusters of serving containers. When a machine-learning serving infrastructure adds a new cluster of a serving containers for a new use case, each routing container may need to update software code to route requests to the new cluster of serving containers.

In accordance with embodiments described herein, there are provided methods and systems for using container information to select containers for executing models. A system receives a request from an application and identifies a version of a machine-learning model associated with the request. The system identifies a set of each serving container corresponding to the machine-learning model from a cluster of available serving containers associated with the version of the machine-learning model. The system selects a serving container from the set of each serving container corresponding to the machine-learning model. If a copy of the machine-learning model is not loaded in the serving container, the system loads the machine-learning model in the serving container. If a copy of the machine-learning model is loaded in the serving container, the system executes, in the serving container, the machine-learning model on behalf of the request. The system responds to the request based on executing the machine-learning model on behalf of the request.

For example, a machine-learning serving infrastructure receives a request for scoring a business opportunity from a Customer Relationship Management (CRM) application and identifies the request requires executing a version of an opportunity scoring machine-learning model. A routing container uses a consistent hashing function to identify the scoring serving containers A, D, and G that can load or have loaded a copy of the opportunity scoring machine-learning model from the cluster of available scoring serving containers A, B, C, D, E. F, and G that can load or have loaded a version of a scoring machine-learning model. The routing container uses a round-robin strategy to select the scoring serving container A from the scoring serving containers A, D, and G that can load or have loaded a copy of the specific opportunity scoring machine-learning model. If a copy of the specific opportunity scoring machine-learning model is not already loaded in the scoring serving container A, then the scoring serving container A loads the specific opportunity scoring machine-learning model. When a copy of the specific opportunity scoring machine-learning model is verified to be loaded in the scoring serving container A, the specific opportunity scoring machine-learning model executes the requested service in the scoring serving container A, and the machine-learning serving infrastructure responds to the CRM application's request. Since not every scoring serving container in the cluster of available scoring serving containers A-G will potentially host each machine-learning model, the cluster of available scoring serving containers can scale to host more machine-learning models than any individual scoring serving container can host.

Methods and systems are provided for using container information to select containers for executing models. First, systems and hash rings for using container information to select containers for executing models will be described with reference to example embodiments. Then methods for using container information to select containers for executing models will be described.

Any of the embodiments described herein may be used alone or together with one another in any combination. The one or more implementations encompassed within this specification may also include embodiments that are only partially mentioned or alluded to or are not mentioned or alluded to at all in this summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

FIG. 1 depicts an example of a system for using container information to select containers for executing models, in an embodiment. As shown in FIG. 1, a system 100 may illustrate a cloud computing environment in which data, applications, services, and other resources are stored and delivered through shared data centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a machine-learning serving infrastructure 108, that may be provided by a hosting company. Although FIG. 1 depicts the first client 102 as a desktop computer 102, the second client 104 as a laptop computer 104, and the third client 106 as a mobile phone 106, each of the clients 102-106 may be any type of computer. The clients 102-106 and the machine-learning serving infrastructure 108 communicate via a network 110.

The machine-learning serving infrastructure 108 includes a gateway 112, and clusters 114-120 of software containers. The cluster 114 of software containers includes software containers 122-126, the cluster 116 of software containers includes software containers 128-132, the cluster 118 of software containers includes software containers 134-138, and the cluster 120 of software containers includes software containers 140-152. The software container 140 includes the machine-learning models 154-160. The machine-learning serving infrastructure 108 also includes a service discovery system 162.

FIG. 1 depicts the system 100 with three clients 102-106, one machine-learning serving infrastructure 108, one network 110, one gateway 112, four clusters 114-120 of software containers, sixteen software containers 122-152, four machine-learning models 154-160, and one service discovery system 162. However, the system 100 may include any number of clients 102-106, any number of machine-learning serving infrastructures 108, any number of networks 110, any number of gateways 112, any number of clusters 114-120 of software containers, any number of software containers 122-152, any number of machine-learning models 154-160, and any number of service discovery systems 162. The systems depicted in FIGS. 4 and 5 and described below may be substantially like the clients 102-106 and to the components 112-162 of the machine-learning serving infrastructure 108.

The cluster 114 of software containers is a cluster 114 of routing containers 122-126, the cluster 116 of software containers is a cluster 116 of ranking serving containers 128-132, and the cluster 118 of software containers is a cluster 118 of recommending containers 134-138. Since the cluster 120 of software containers is a cluster 120 of scoring serving containers 140-152, the scoring serving container 140 includes the models 154-160 that are machine-learning models which learn to score. Each cluster 116-120 of serving containers may load a version of a type of machine-learning models. For example, the cluster 120 of scoring serving containers load a version of a type of machine-learning models 154-160 which share a library for scoring opportunities. In another example, the cluster 118 of recommending serving containers load a version of a type of machine-learning models which share a library for recommending opportunities to sales representatives. In yet another example, the cluster 116 of ranking serving containers load a version of a type of machine-learning models that share a library for ranking opportunities for each sales representative. Therefore, if a request from a tenant's application requires the services of these versions of machine-learning models, then any of the routing containers 122-126 can split the request into separate sub-requests, and then route the sub-requests to their corresponding clusters 116-120 of serving containers. Although these examples describe the clusters 116-120 of serving containers that serve one version of the scoring type of machine-learning models 140-152, one version of the recommending type of machine-learning models 134-138, and one version of the ranking type of machine-learning models 128-132, any clusters of any serving containers may serve any number of versions of any number of any types of any machine-learning models.

Upon startup, each of the serving containers 128-152 registers with the service directory 162 by providing the serving container's registration information, such as the host and/or the port. When any of the serving containers 128-152 is no longer available, or becomes unavailable (intentionally or unintentionally), the service discovery system 162 deletes the unavailable serving container's registration information. An available serving container may be referred to as an actual serving container. An available serving container can be an isolated computer program execution environment that is enabled by a computer's operating system, and which is currently able to execute the main functionality of a machine-learning model.

The service discovery system 162 may be implemented by HashiCorp Consul, Apache Zookeeper, Cloud Native Computing Foundation etcd, Netflix eureka, or any similar tool that provides a service discovery and/or a service registration system. The service discovery system 162 may not be designed to store a large amount of data, such as each serving container's comprehensive registration information. The following is a hierarchy of virtual directories, files, or cnodes that can represent the serving container information for the serving containers A 128, B 130, . . . G 152, which the machine-learning serving infrastructure 108 uses to determine what to do at any point of time. Container information can be data about an isolated computer program execution environment that is enabled by a computer's operating system, and that executes the main functionality of a machine-learning model.

/mlservices/cluster[i]/scoring/version
  /container_state
    /containerA140//ephemeral node—if not there, the container is dead
    . . .
    /containerG152
/mlservices/cluster[i]/recommending/version
  /container_state
    /containerA134//ephemeral node—if not there, the container is dead
    . . .
    /containerC138
/mlservices/cluster[i]/ranking/version
  /container_state
    /containerA128//ephemeral node—if not there, the container is dead
    . . .
    /containerC132

For the following numerical examples, the size of the data that the service discovery system 162 keeps in memory is based on the following assumptions. Each cluster 116-120 of serving containers includes 100 serving containers, with 5 supported cluster versions per cluster type. For this example, the machine-learning serving infrastructure 108 is also going to serve 10 Bring Your Own serving Container (BYOC) use cases with 5 cluster versions per each cluster type.

/mlservices/cluster[i]/scoring/version/container_state/containerN (on a scoring container) stores 64 bytes (hostname+port) of container information per serving container /mlservices/cluster[i]/scoring/version/container_state stores 64 B of container information per serving container for 100 containers per cluster version: 64 B*100=6.4 KB of container information per cluster version /mlservices/cluster[i]/scoring/stores 6.4 KB of container information per cluster version for 5 cluster versions per cluster type: 6.4 KB*5=32 KB of container information per cluster type /mlservices stores 32 KB of container information per cluster for 13 clusters types (scoring, recommending, ranking, and 10 BYOC): 32 KB*13=416 KB of container information for the service discovery system 162.

When the machine-learning serving infrastructure 108 adds any new cluster 116-120 of serving containers, any of the new serving containers 128-152 registers with the service discovery system 162 according to the data model (container_state), without any need to update the code in any of the routing containers 122-126. When the machine-learning serving infrastructure 108 discontinues or terminates any old cluster 116-120 of serving containers, the metadata for any of the old cluster's serving containers 128-152 is removed from the service discovery system 162 according to the data model (container_state).

When the machine-learning serving infrastructure 108 adds any of the new serving containers 128-152 to any of the existing clusters 116-120 of serving containers, any of the new serving containers 128-152 updates the service discovery system 162 according to the data model (container_state). When any of the existing serving containers 128-152 in any of the existing clusters 116-120 of serving containers dies unexpectedly, or gracefully, the serving container's heartbeat to the service discovery system 162 fails. Then the machine-learning serving infrastructure 108 removes the ephemeral virtual directory, file, or cnode from the service discovery system 162, which updates the container_state in the service discovery system 162.

Each of the routing containers 122-126 has a watcher that watches the service discovery system 162 for changes in the available serving containers 128-152 in the clusters 116-120 of serving containers, and then provides notifications of any changes in the information about the serving containers 128-152 to its routing container 122-126 to update a map, or any similar data structure, of the available serving containers 128-152 asynchronously. The notified routing containers 122-126 will use their updated maps of the available serving containers 128-152 to route new requests, which are received via the gateway 112, to the available serving containers 128-152. Based on the previous numerical examples, each of the routing containers 122-126 requires 416 KB additional memory to store registration information for the available serving containers 128-152. A data structure can be the organization, management, and storage format of information which enables efficient access and modification.

If a new version of a machine-learning model is available, and a request from a tenant's application identifies the new version of the machine-learning model, then any one of the routing containers 122-126 will identify any subset of the available serving containers 128-152 in the clusters 116-120 of serving containers that may have loaded a copy of the old version of the machine-learning model, which may be used for loading the new version of the machine-learning model. A copy can be an entity that is made to be similar or identical to another entity. If the old version of the machine-learning model is to be discontinued, the routing metadata will change to route requests to the new version of the machine-learning model, such that a copy of the old version of the machine-learning model expires in cache and is unloaded from memory.

When routing a request to any of the serving containers 128-152 in any of the clusters 116-120 of available serving containers, each of the routing containers 122-126 can use a function, such as a consistent hashing function, to determine which potential set of serving containers, which would be a subset of the available serving containers 128-152 in any of the clusters 116-120 of serving containers, are the potential destination serving containers for routing the request. A consistent hashing function can be an operation that can be used to repeatedly map specific data of arbitrary size to the same corresponding fixed-size values. A set can be a group or collection of entities that belong together or resemble one another or are usually found together.

In a general example of consistent hashing, a routing container uses a hash function to hash the identifiers of each of the serving containers in a cluster of available serving containers onto corresponding hashed value locations on a hash ring, which may be referred to as a unit circle. Upon receiving a request from a tenant which requires the service of a specific machine-learning model, the routing container uses the same hash function to hash the identifier of the specific machine-learning model to its corresponding hashed value location on the same hash ring. Then the routing container identifies the tenant's replication factor for the specific machine-learning model and equates the replication factor to the number of the serving containers that will be identified as the potential subset of the serving containers, from the cluster of available serving containers, for loading the specific machine-learning model. Beginning from the same hash ring's hashed value location for the specific machine-learning model, the routing container traverses the hash ring, identifying the hashed value locations on the hash ring to which the identifiers of the serving containers have been hashed, until the number of hashed value locations to which the identifiers of the serving containers have been hashed equals the tenant's replication factor for the specific machine-learning model. Then the routing container identifies the serving containers that correspond to these locations on the hash ring as the serving containers that will potentially load the specific machine-learning model. An identifier can be a sequence of characters used to refer to a computer program or an element, such as a variable or a set of data, within the program.

Figure 2A:
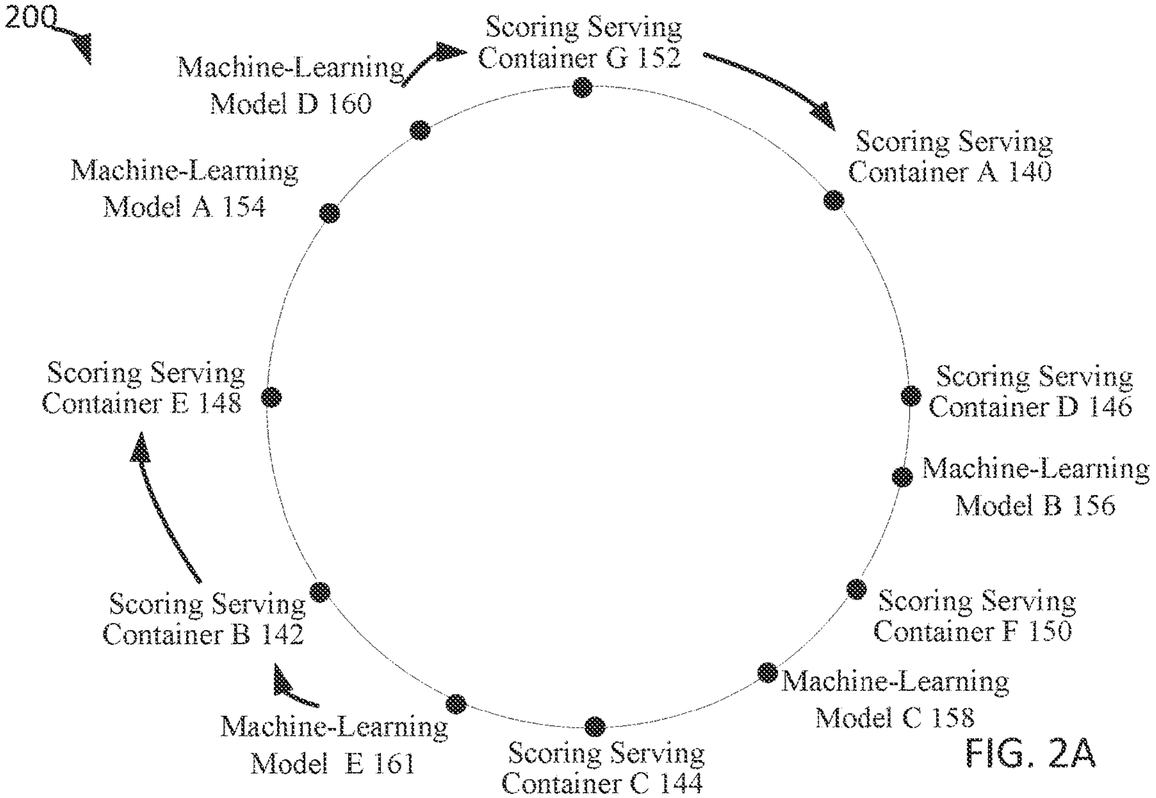
FIGS. 2A-B illustrate diagrams of example hash rings for using container information to select containers for executing models, under an embodiment.

FIG. 2A depicts an example hash ring 200 for copies of machine-learning models that need to be executed to respond to requests from applications. The routing container 122 applies the consistent hash function to the identifier of the new machine-learning model D 160 to determine its hash value, and then determines that the location of this hash value on the hash ring 200 is before the location of the hash value of the scoring serving container G 152 in the hash ring. In this case, since the replication factor for the new machine-learning model D 160 is two, the routing container 122 selects the next two locations of the next two hash values on the hash ring 200, which correspond to the scoring serving container G 152 and the scoring serving container A 140 as the potential containers for loading a copy of the new machine-learning model D 160.

Since multiple serving containers could potentially load a machine-learning model, a routing container can implement a round-robin strategy, rotating container strategy, or any other strategy that may be aligned with usual load balancing strategies. For example, each of the routing containers 122-126 can use a different seed value, so that not all of them implement the same round-robin strategy starting from the same serving container. In this example, the three routing containers 122-126 are responsible for routing requests to the three scoring serving containers A 140, B 142, and C 144. Then the first routing container 122 may route requests to these scoring serving containers in the order of the scoring serving containers A 140, B 142, and C 144; the second routing container 124 may route requests to these scoring serving containers in the order of the scoring serving containers B 142, C 144, and A 140; and the third routing container 126 may route requests to the scoring serving containers in the order of the scoring serving containers C 144, A 140, and B 142. Therefore, a routing container can select one serving container from the subset of serving containers and route the request to the selected scoring serving container.

If the selected serving container has already loaded a copy of the specific machine-learning model, and the selected serving container is not currently executing the specific machine-learning model for a previous request, the selected serving container executes a copy of the specific machine-learning model that has been pre-loaded in cache to provide a service for the new request. If a copy of the selected serving container has not already loaded the specific machine-learning model, the selected serving container loads the specific machine-learning model in cache, and then executes a copy of the specific machine-learning model that was just loaded in cache to provide a service for the new request. If the selected serving container is currently executing the specific machine-learning model for a previous request, then depending on the resource capacities of the selected serving container, the selected serving container can wait until finished executing the specific machine-learning model for a previous request before loading the specific machine-learning model in cache, can load an additional copy of the specific machine-learning model in cache, or can request that one of the other potential serving containers loads the specific machine-learning model in cache. Once verified to be loaded in cache, a copy of the specific machine-learning model is executed to provide a service for the new request.

If needed, a routing container combines any sub-responses to any sub-requests into one response for one request. A routing container routes any response(s) from any cluster(s) of available serving containers to the requesting tenant's application.

A routing container can perform load balancing if any serving container is added to and/or subtracted from a cluster of available serving containers. For a pre-load balancing example, FIG. 2A depicts the example hash ring 200 for a copy of the machine-learning model E 161 (which is not depicted in FIG. 1) that was loaded to provide a service for a request from a tenant's application. The routing container 122 applied the consistent hash function to the identifier of a copy of the machine-learning model E 161 to determine its hash value, and then determined that the location of this hash value on the hash ring 200 is before the location of the hash value of the scoring serving container B 142 in the hash ring. In this case, since the replication factor for the machine-learning model E 161 is two, the routing container 122 selected the next two locations of the next two hash values on the hash ring, which corresponded to the scoring serving container B 142 and the scoring serving container E 148 as the potential scoring serving containers for loading a copy of the machine-learning model E 161.

In another pre-load balancing example, as described above, FIG. 2A depicts the example hash ring 200 for a copy of the machine-learning model D 160 that was loaded to provide another service for another request from another tenant's application. The routing container 122 applied the consistent hash function to the identifier of a copy of the machine-learning model D 160 to determine its hash value, and then determined that the location of this hash value on the hash ring 200 is before the location of the hash value of the scoring serving container G 152 in the hash ring. In this case, since the replication factor for the machine-learning model D 160 is two, the routing container 122 selected the next two locations of the next two hash values on the hash ring 200, which corresponded to the scoring serving container G 152 and the scoring serving container A 140 as the potential scoring serving containers for loading a copy of the machine-learning model D 160.

Figure 2B:
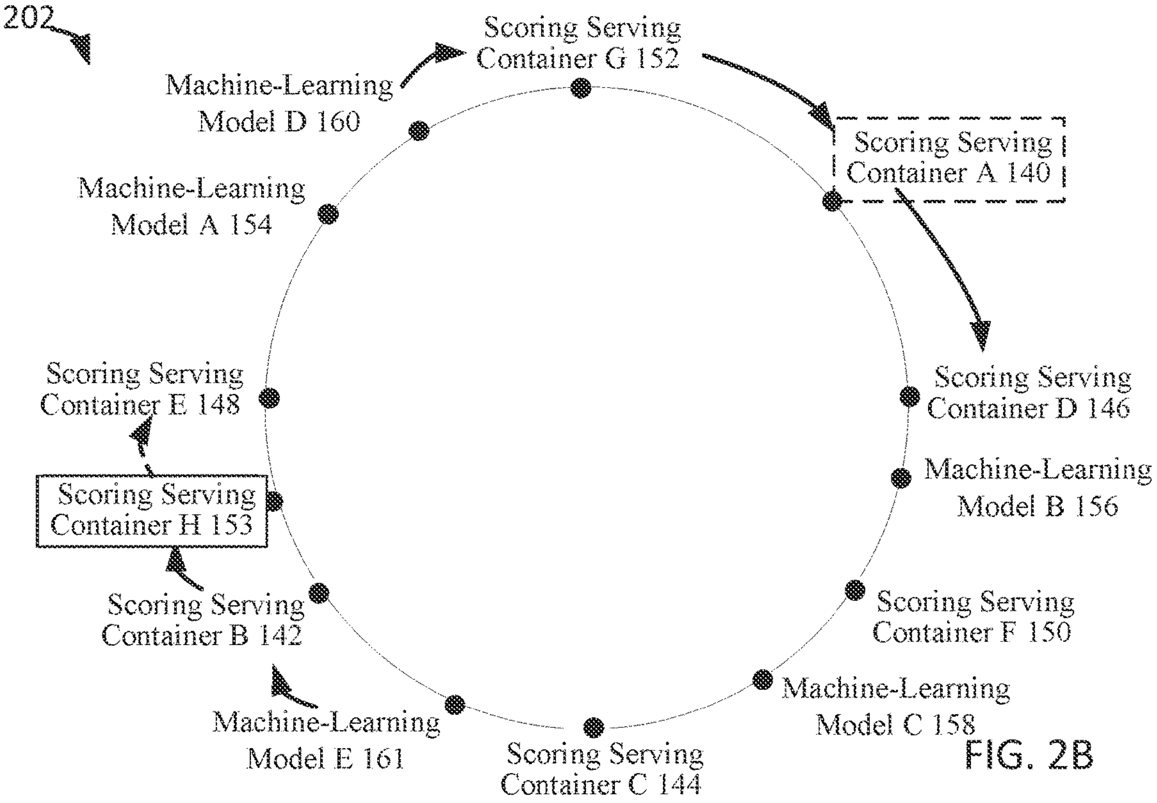

The routing container 122 performs load balancing when the scoring serving container A 140 is subtracted from the cluster 116 of scoring serving containers and when the scoring serving container H 153 (which is not depicted in FIG. 1) is added to the cluster 116 of scoring serving containers. For example, FIG. 2B depicts an example hash ring 202 for a copy of the machine-learning model D 160 that is requested by a tenant's application. The routing container 122 applies the consistent hash function to the identifier of a copy of the machine-learning model D 160 to determine its hash value, and then determines that the location of this hash value on the hash ring 202 is before the location of the hash value of the scoring serving container G 152 in the hash ring.

In this case, since the replication factor for the machine-learning model D 160 is two, the routing container 122 selects the next two locations of the next two hash values on the hash ring 202. These two locations correspond to the scoring serving container G 152 as the first potential scoring serving container for loading a copy of the machine-learning model D 160 and would have corresponded to the scoring serving container A 140 as the second potential scoring serving container for loading a copy of the machine-learning model D 160. However, since the scoring serving container A 140 is unavailable in this example, the routing container 122 selects the next location of the next hash value on the hash ring 202, which corresponds to the scoring serving container D 146 as the second potential scoring serving container for loading a copy of the machine-learning model D 160. In this example, the routing container 122 performs load balancing when the scoring serving container A 140 is subtracted from the cluster 116 of scoring serving containers by identifying the scoring serving container D 146, instead of the currently unavailable scoring serving container A 140, as the second potential container for loading a copy of the machine-learning model D 160.

In another example, FIG. 2B depicts the example hash ring 202 for the machine-learning model E 161 that is requested by a tenant's application. The routing container 122 applies the consistent hash function to the identifier of a copy of the machine-learning model E 161 to determine its hash value, and then determines that the location of this hash value on the hash ring 202 is before the location of the hash value of the scoring serving container B 142 in the hash ring 202. In this case, since the replication factor for a copy of the machine-learning model E 161 is two, the routing container 122 selects the next two locations for the next two hash values on the hash ring 202, which correspond to the scoring serving container B 142 as the first potential scoring serving container for loading a copy of the machine-learning model E 161 and would have corresponded to the scoring serving container E 148 as the second potential scoring serving container for loading a copy of the machine-learning model E 161.

However, the location of the hash value for the new scoring serving container H 153 is between the locations of the hash values for the scoring serving container B 142 and the scoring serving container E 148 on the hash ring 202. Therefore, the routing container 122 selects the next location for the next hash value after the location for the hash value for the scoring serving container B 142 on the hash ring 202, which corresponds to the new scoring serving container H 153 as the second potential scoring serving container for loading a copy of the machine-learning model E 161. In this example, the routing container 122 performs load balancing when the new scoring serving container H 153 is added to the cluster 116 of scoring serving containers by identifying the new scoring serving container H 153, instead of the scoring serving container E 148 as the second potential scoring serving container for loading a copy of the machine-learning model E 161.

Figure 3A:
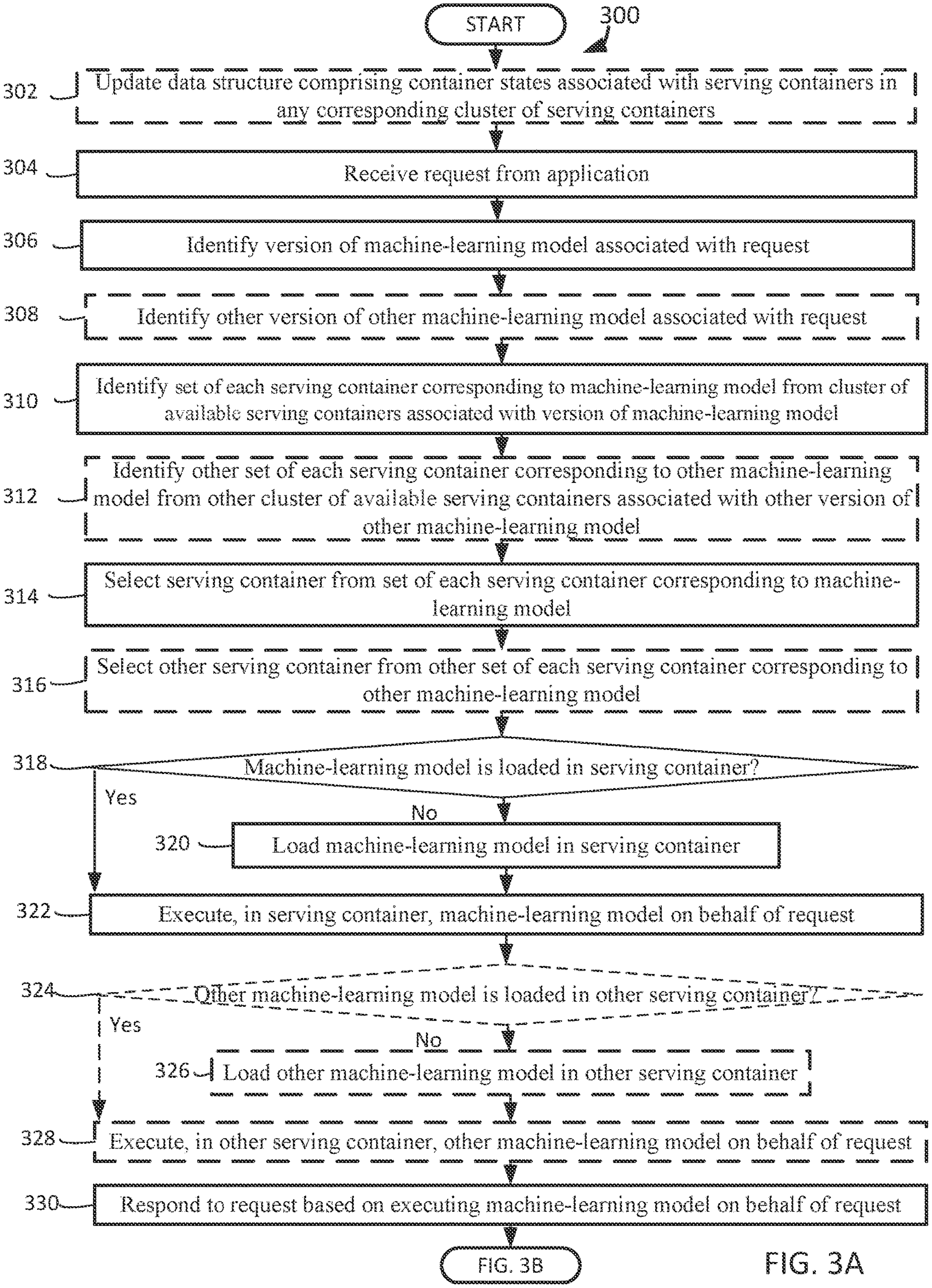
FIGS. 3 A-B depict an operational flow diagram illustrating an overview of a method for using container information to select containers for executing models, in an embodiment.
Figure 3B:
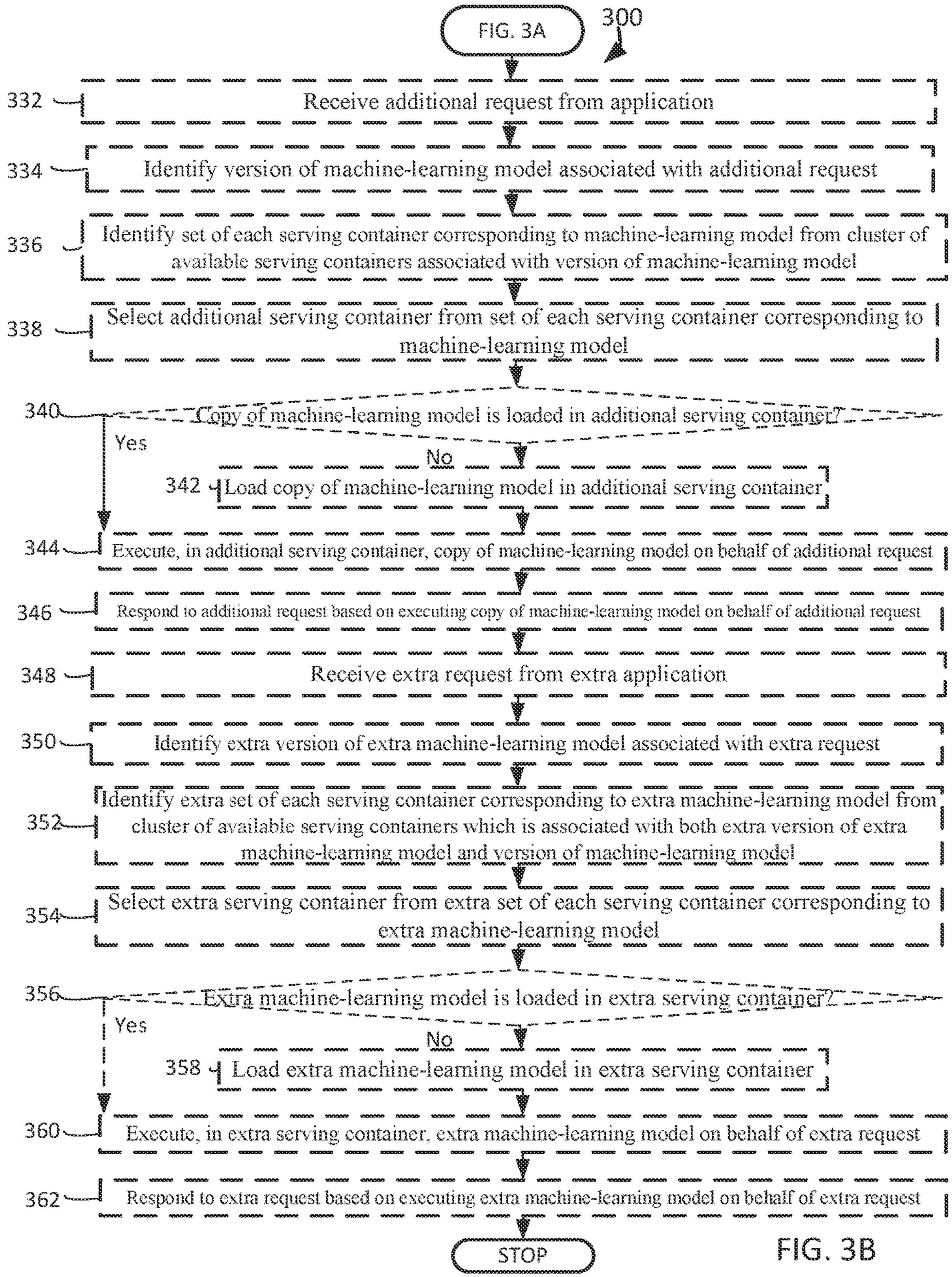

FIGS. 3 A-B depict an operational flow diagram illustrating a high-level overview of a method 300 for using container information to select containers for executing models. The method 300 may be implemented on either a centralized computing platform or in parallel on a distributed computing platform.

A data structure is optionally updated with container information associated with serving containers in any corresponding cluster of serving containers, box 302. The system can update a map of available serving containers. In embodiments, this can include the service discovery system 162 receiving notifications of the available container information from each of the serving containers 128-152 in the clusters 116-120 of serving containers, and then updating the container_state map for the serving containers 128-152 in the clusters 116-120 of serving containers.

In addition to optionally updating a map of serving containers that are available to execute machine-learning models, a request is received from an application, box 304. The system receives many requests that can require the execution of machine-learning models. For example, and without limitation, this can include the machine-learning serving infrastructure 108 receiving a request for scoring a list of purchasable contacts as Acme Corporation's business opportunities. The request is from a Customer Relationship Management (CRM) application executed by an Acme sales manager Ann on her laptop computer 104. Ann's request also requires that the scored business opportunities be recommended to various Acme sales representatives, such as Bob.

After a request is received, a version is identified of a machine-learning model associated with the request, box 306. The system identifies a version of a machine-learning model to be executed. By way of example and without limitation, this can include the machine-learning serving infrastructure 108 identifying that Ann's request requires executing a version of the opportunity scoring machine-learning model A 154 used by Acme's CRM application.

Following receipt of a request, another version is optionally identified of another machine-learning model associated with the request, box 308. The system can identify multiple versions of machine-learning models to be executed. In embodiments, this can include the machine-learning serving infrastructure 108 identifying that Ann's request also requires executing a version of the opportunity recommending machine-learning model used by Acme's CRM application. Therefore, the machine-learning serving infrastructure 108 splits Ann's request into sub-requests due to identifying both a version of Acme's opportunity scoring machine-learning model A 154 and a version of Acme's opportunity recommending machine-learning model.

Having identified a version of a machine-learning model, a set is identified of each serving container corresponding to the machine-learning model from a cluster of available serving containers associated with the version of the machine-learning model, box 310. The system identifies a cluster of available serving containers that serve a version of the identified machine-learning model and the specific serving containers in the cluster that might load the identified machine-learning model. For example, and without limitation, this can include the routing container 122 using a consistent hashing function to identify the scoring serving containers A 140, D 146, and G 152, which can load or have loaded a copy of Acme's opportunity scoring machine-learning model A 154, from the cluster 120 of available scoring serving containers A 140, B 142, C 144, D 146, E 148. F 150, and G 152, which can load or have loaded a copy of any scoring machine-learning model that shares the same library to generate the scores of business opportunities.

In addition to identifying another version of another machine-learning model, another set is optionally identified of each serving container corresponding to the other machine-learning model from a cluster of available serving containers associated with the other version of the other machine-learning model, box 312. The system can identify another cluster of available serving containers that serve a version of another identified machine-learning model and the specific serving containers in the other cluster that might load the other identified machine-learning model. By way of example and without limitation, this can include the routing container 122 using the same consistent hashing function to identify the recommending serving containers B 136 and C 138, which can load or have loaded a copy of Acme's opportunity recommending machine-learning model, from the cluster 118 of recommending serving containers A 134, B 136, and C 138, which can load or have loaded a copy of any recommending machine-learning model that shares the same library to generate recommendations of business opportunities.

After identifying a set of each serving container corresponding to a machine-learning model, a serving container is selected from the set of each serving container corresponding to the machine-learning model, box 314. The system selects one of the identified serving containers. In embodiments, this can include the routing container 122 using a round-robin strategy to select the scoring serving container A 140 from the scoring serving containers A 140, D 146, and G 152, which can load or have loaded a copy of Acme's opportunity scoring machine-learning model A 154.

Following identification of another set of each serving container corresponding to another machine-learning model, another serving container is optionally selected from the other set of each serving container corresponding to the other machine-learning model, box 316. The system can select one of the other identified serving-containers. For example, and without limitation, this can include the routing container 122 using a round-robin strategy to select the recommending serving container C 138 from the recommending serving containers B 136 and C 138, which can load or have loaded a copy of Acme's opportunity recommending machine-learning model.

Having selected a serving container, a determination is made whether a copy of the identified machine-learning model is loaded in the serving container, box 318. The system determines whether a copy of the selected serving container needs to load the identified machine-learning model. By way of example and without limitation, this can include the scoring serving container A 140 determining whether the scoring serving container A 140 has loaded a copy of Acme's opportunity scoring machine-learning model A 154. If a copy of the identified machine-learning model is not loaded in the selected serving container, the method 300 continues to block 320 to load the identified machine-learning model in the selected serving container. If a copy of the identified machine-learning model is loaded in the selected serving container, the method 300 proceeds to block 322 to execute a copy of the identified machine-learning model in the selected serving container.

If a copy of the identified machine-learning model is not loaded in the selected serving container, a copy of the identified machine-learning model is loaded in the selected serving container, box 320. The system can load the identified machine-learning model in the selected serving container if needed. In embodiments, this can include the scoring serving container A 140 loading a copy of Acme's opportunity scoring machine-learning model A 154.

If a copy of the identified machine-learning model is loaded in the selected serving container, a copy of the identified machine-learning model is executed in the selected serving container on behalf of the request, box 322. The system executes the identified machine-learning model in the selected serving container. For example, and without limitation, this can include a copy of Acme's opportunity scoring machine-learning model A 154 scoring the purchasable business contacts as Acme's business opportunities, after a copy of Acme's opportunity scoring machine-learning model A 154 is verified as loaded in the scoring serving container A 140.

In addition to selecting another serving container, a determination is optionally made whether a copy of the other identified machine-learning model is loaded in the other selected serving container, box 324. The system can determine whether the other selected serving container needs to load the other identified machine-learning model. By way of example and without limitation, this can include the recommending serving container C 138 determining whether a copy of the recommending serving container C 138 has loaded a copy of Acme's opportunity recommending machine-learning model. If a copy of the other identified machine-learning model is not loaded in the other selected serving container, the method 300 continues to block 326 to load a copy of the other identified machine-learning model in the other selected serving container. If a copy of the other identified machine-learning model is loaded in the other selected serving container, the method 300 proceeds to block 328 to execute a copy of the other identified machine-learning model in the other selected serving container.

If a copy of the other identified machine-learning model is not loaded in the other selected serving container, a copy of the other identified machine-learning model is optionally loaded in the other selected serving container, box 326. The system can load a copy of the other identified machine-learning model in the other selected serving container. In embodiments, this can include the recommending serving container C 138 loading a copy of Acme's opportunity recommending machine-learning model.

If a copy of the other identified machine-learning model is loaded in the other selected serving container, a copy of the other identified machine-learning model is optionally executed in the other selected serving container on behalf of the request, box 328. The system can execute the other identified machine-learning model in the other selected serving container. For example, and without limitation, this can include a copy of Acme's opportunity recommending machine-learning model recommending the purchasable business contacts as Acme's business opportunities to Acme's sales representatives, after a copy of Acme's opportunity recommending machine-learning model is verified as loaded in the recommending serving container C 138.

After executing a copy of the identified machine-learning model in the selected serving container on behalf of a request, the request is responded to, based on executing a copy of the identified machine-learning model on behalf of the request, box 330. The system responds to a request by executing a copy of the identified machine-learning model(s) in the selected serving container(s). By way of example and without limitation, this can include the machine-learning serving infrastructure 108 responding to Ann's request with the scored list of purchasable contacts as Acme Corporation's business opportunities, which are recommended to various Acme sales representatives, such as Bob.

In addition to receiving a request from an application, an additional request is optionally received from the same application, box 332. The system can receive many requests that can require the execution of machine-learning models. In embodiments, this can include the machine-learning serving infrastructure 108 receiving an additional request, which requires scoring some of last week's list of purchased contacts as Acme's business opportunities. The additional request is from Acme's CRM application executed by an Acme sales representative Bob on his mobile phone 106. Bob's request also requires that his scored business opportunities be ranked to determine his personal priorities for working on these business opportunities.

After an additional request is received, a version is optionally identified of a machine-learning model associated with the additional request, box 334. The system can identify a version of a machine-learning model to be executed. For example, and without limitation, this can include the machine-learning serving infrastructure 108 identifying that Bob's request requires executing a version of the opportunity scoring machine-learning model A 154 used by Acme's CRM application. The machine-learning serving infrastructure 108 may also identify that Bob's request also requires executing a version of the opportunity ranking machine-learning model used by Acme's CRM application. Therefore, the machine-learning serving infrastructure 108 may split Bob's request into sub-requests due to identifying both a version of Acme's opportunity scoring machine-learning model A 154 and a version of Acme's opportunity ranking machine-learning model.

Following an identification of a version of a machine-learning model, a set is optionally selected of each serving container corresponding to the machine-learning model from a cluster of available serving containers associated with the version of the machine-learning model, box 336. The system can identify the cluster of available serving containers that serve a version of the identified machine-learning model and the specific serving containers in the cluster that might load the identified machine-learning model. By way of example and without limitation, this can include the routing container 124 using the same consistent hashing function to identify the scoring serving containers A 140, D 146, and G 152, which can load or have loaded a copy of Acme's opportunity scoring machine-learning model A 154, from the cluster 120 of available scoring serving containers A 140, B 142, C 144, D 146, E 148. F 150, and G 152, which can load or have loaded a copy of any scoring machine-learning model that shares the same library to generate the scores of business opportunities. The routing container 124 may also use the same consistent hashing function to identify the ranking serving containers A 128 and C 132, which can load or have loaded a copy of Acme's opportunity ranking machine-learning model, from the cluster 116 of ranking serving containers A 128, B 130, and C 132, which can load or have loaded a copy of any ranking machine-learning model that shares the same library to generate the rankings of business opportunities.

Having identified a set of each serving container corresponding to an identified machine-learning model, an additional serving container is optionally selected from the set of each serving container corresponding to the identified machine-learning model, box 338. The system can select one of the identified serving containers. In embodiments, this can include the routing container 124 using the same round-robin strategy with a different seed to select the scoring serving container G 152 from the scoring serving containers A 140, D 146, and G 152, which can load or have loaded a copy of Acme's opportunity scoring machine-learning model A 154. The routing container 124 may also use the same round-robin strategy with a different seed to select the ranking serving container C 132 from the ranking serving containers A 128 and C 132, which can load or have loaded a copy of Acme's opportunity ranking machine-learning model.

The machine-learning serving infrastructure 108 may use the same consistent hashing function to route Ann's sub-request for opportunity scoring and Bob's sub-request for opportunity scoring to the same scoring serving containers A 140, D 146, and G 152, which can load or have loaded a copy of Acme's opportunity scoring machine-learning model A 154. However, the use of the same round-robin strategy with different seeds enables the routing containers 122 and 124 to select the different scoring serving containers A 140 and G 152 for Ann's sub-request and Bob's sub-request, respectively. These different scoring serving containers A 140 and G 152 can simultaneously execute their own copies of Acme's opportunity scoring machine-learning model A 154. Even if the same scoring serving container loaded different copies of Acme's opportunity scoring machine-learning model A 154 for Ann's sub-request and Bob's sub-request, the same scoring serving container could simultaneously execute both copies of Acme's opportunity scoring machine-learning model A 154.

In addition to selecting an additional serving container, a determination is optionally made whether a copy of the identified machine-learning model is loaded in the additional serving container, box 340. The system can determine whether the selected additional serving container needs to load a copy of the identified machine-learning model. For example, and without limitation, this can include the scoring serving container G 152 determining whether the scoring serving container G 152 has loaded a copy of Acme's opportunity scoring machine-learning model A 154. The routing container 124 may also determine whether the ranking serving container C 132 has loaded a copy of Acme's opportunity ranking machine-learning model. If a copy of the identified machine-learning model is not loaded in the additional selected serving container, the method 300 continues to block 342 to load a copy of the identified machine-learning model in the additional selected serving container. If a copy of the identified machine-learning model is loaded in the additional selected serving container, the method 300 proceeds to block 344 to execute the copy of the identified machine-learning model in the additional selected serving container.

If a copy of the identified machine-learning model is not loaded in the additional selected serving container, a copy of the identified machine-learning model is optionally loaded in the additional selected serving container, box 342. The system can load a copy of the identified machine-learning model in the selected additional serving container. By way of example and without limitation, this can include the scoring serving container G 152 loading a copy of Acme's opportunity scoring machine-learning model A 154. Also, the ranking serving container C 132 may load a copy of Acme's opportunity ranking machine-learning model.

If a copy of the identified machine-learning model is loaded in the additional selected serving container, the copy of the identified machine-learning model is optionally executed in the additional selected serving container on behalf of the additional request, box 344. The system can execute a copy of the identified machine-learning model in the additional selected serving container. In embodiments, this can include a copy of Acme's opportunity scoring machine-learning model A 154 scoring some of last week's purchased business contacts as Acme's business opportunities, after a copy of Acme's opportunity scoring machine-learning model A 154 is verified as loaded in the scoring serving container G 152. Also, a copy of Acme's opportunity ranking machine-learning model may rank some of last week's purchased business contacts to determine Bob's personal priorities for working on these business opportunities, after a copy of Acme's opportunity ranking machine-learning model is verified as loaded in the ranking serving container C 132.

After executing a copy of the identified machine-learning model for an additional request in an additional selected serving container, the additional request is optionally responded to, based on executing the copy of the identified machine-learning model on behalf of the additional request, box 346. The system can respond to an additional request by executing a copy of any identified machine-learning model(s) in any selected serving container(s). For example, and without limitation, this can include the machine-learning serving infrastructure 108 responding to Bob's request with his priority-ranked list of some of last week's purchased contacts.

In addition to receiving a request from an application, an extra request is optionally received from an extra application, box 348 The system can receive many requests that can require the execution of machine-learning models. By way of example and without limitation, this can include the machine-learning serving infrastructure 108 receiving an extra request, which requires scoring a list of purchasable contacts as Mega Corporation's business opportunities. The extra request is from a CRM application executed by a MegaCorp sales manager Chris on the desktop computer 102. Chris' request also requires that the scored business opportunities be recommended to various MegaCorp sales representatives, and that these scored business opportunities be ranked to determine each MegaCorp sales representatives' personal priorities for working on these business opportunities.

After an extra request is received, an extra version is optionally identified of an extra machine-learning model associated with the extra request, box 350. The system can identify a version of a machine-learning model to be executed. In embodiments, this can include the machine-learning serving infrastructure 108 identifying that Chris' request requires executing a version of the opportunity scoring machine-learning model E 161 used by MegaCorp's CRM application. The machine-learning serving infrastructure 108 may also identify that Chris' request also requires executing a version of the opportunity recommending machine-learning model used by MegaCorp's CRM application and a version of the opportunity ranking machine-learning model used by MegaCorp's CRM application. Therefore, the machine-learning serving infrastructure 108 may split Chris' request three ways into sub-requests due to identifying a version of MegaCorp's opportunity scoring machine-learning model E 161, a version of MegaCorp's opportunity recommending machine-learning model, and a version of MegaCorp's opportunity ranking machine-learning model.

Following an identification of an extra version of an extra machine-learning model, an extra set is optionally selected of each serving container corresponding to the extra machine-learning model from a cluster of available serving containers associated with both the extra version of the extra machine-learning model and the identified version of the identified machine-learning model, box 352. The system can identify the cluster of available serving containers that serve a version of the identified machine-learning model and the specific serving containers in the cluster that might load the identified machine-learning model. For example, and without limitation, this can include the routing container 126 using the same consistent hashing function to identify the scoring serving containers B 142 and E 148, which can load or have loaded a copy of MegaCorp's opportunity scoring machine-learning model E 161, from the cluster 120 of available scoring serving containers A 140, B 142, C 144, D 146, E 148. F 150, and G 152, which can load or have loaded a copy of any scoring machine-learning model that shares the same library to generate the scores of business opportunities.

The routing container 126 may also use the same consistent hashing function to identify the recommending serving containers A 134 and B 136, which can load or have loaded a copy of MegaCorp's opportunity recommending machine-learning model, from the cluster 118 of recommending serving containers A 134, B 136, and C 138, which can load or have loaded a copy of any recommending machine-learning model that shares the same library to generate the recommendations of business opportunities. The routing container 126 may further use the same consistent hashing function to identify the ranking serving containers B 130 and C 132, which can load or have loaded a copy of MegaCorp's opportunity ranking machine-learning model, from the cluster 116 of ranking serving containers A 128, B 130, and C 132, which can load or have loaded a copy of any ranking machine-learning model that shares the same library to generate the rankings of business opportunities.

Having identified an extra set of each serving container corresponding to an extra machine-learning model, an extra serving container is optionally selected from the extra set of each serving container corresponding to the extra machine-learning model, box 354. The system can select one of the identified serving containers. By way of example and without limitation, this can include the routing container 126 using the same round-robin strategy with a different seed to select the scoring serving container E 148 from the scoring serving containers B 142 and E 148, which can load or have loaded a copy of MegaCorp's opportunity scoring machine-learning model E 161.

The routing container 126 may also use the same round-robin strategy with a different seed to select the recommending serving container B 136 from the recommending serving containers A 134 and B 136, which can load or have loaded a copy of MegaCorp's opportunity recommending machine-learning model. The routing container 126 may further use the same round-robin strategy with a different seed to select the ranking serving container B 130 from the ranking serving containers B 130 and C 132, which can load or have loaded a copy of MegaCorp's opportunity ranking machine-learning model.

The routing container 126 may use a consistent hashing function to route MegaCorp's sub-request for opportunity scoring to the cluster 120, which includes the scoring serving containers B 142 and E 148, which can load or have loaded a copy of MegaCorp's opportunity scoring machine-learning model E 161. The routing containers 122 and 124 may also use the same consistent hashing function to route Acme's sub-requests for opportunity scoring to the same cluster 120, which includes scoring serving containers A 140, D 146, and G 152, which can load or have loaded a copy of Acme's opportunity scoring machine-learning model A 154. Therefore, even though both MegaCorp's sub-request for opportunity scoring and Acme's sub-requests for opportunity scoring are routed to the same cluster 120 of scoring serving containers, these two tenants' specific opportunity scoring machine-learning models E 161 and A 154, respectively, are hosted by different scoring serving containers.

However, the same serving container may host both tenants' machine-learning models E 161 and A 154. In a multi-tenant system, the data for multiple tenants may be stored in the same physical database object, but the tenant data is arranged so that data of one tenant is kept logically separate from that of other tenants so that one tenant does not have access to another tenant's data, unless such data is expressly shared. No tenant or identifiable data is stored in the shared service discovery system 162. The machine-learning serving infrastructure 108 provides security mechanisms to keep each tenant's data separate unless the data is shared. Each serving container 128-152 is configured to handle requests for any user associated with any organization that is a tenant.

The three scoring serving containers A 140, D 146, and G 152 in the cluster 120 potentially host a copy of Acme's opportunity scoring machine-learning model A 154, the two scoring serving containers B 142 and E 152 in the cluster 120 potentially host a copy of MegaCorp's opportunity scoring machine-learning model E 161, and the two scoring serving containers C 144 and F 154 in the cluster 120 do not host either a copy of Acme's opportunity scoring machine-learning model A 154 or a copy of MegaCorp's opportunity scoring machine-learning model E 161. Consequently, the seven scoring serving containers 140-152 host an aggregated total of five copies of these tenants' specific opportunity scoring machine-learning models. In contrast, each of the seven completely redundant scoring serving container in a typical cluster of seven completely redundant scoring serving containers would host copies of the two opportunity scoring machine-learning models for the tenants, which would result in an aggregated total of fourteen copies of these tenants' specific opportunity scoring machine-learning models. Even when using numerical examples based on a small cluster of only seven scoring serving containers, the cluster 120 filling with five copies of models compared against the typical cluster filling with fourteen copies of models results in an estimate that each scoring serving container in a typical cluster would fill with models approximately 2.8 times (fourteen copies divided by five copies) faster than the cluster 120 would fill with models.

In addition to selecting an extra serving container, a determination is optionally made whether a copy of an extra identified machine-learning model is loaded in the extra selected serving container, box 356. The system can determine whether the extra selected serving container needs to load a copy of the extra identified machine-learning model. In embodiments, this can include the scoring serving container E 148 determining whether the scoring serving container E 148 has loaded a copy of MegaCorp's opportunity scoring machine-learning model E 161. The routing container 126 may also determine whether the recommending serving container B 136 has loaded a copy of MegaCorp's opportunity recommending machine-learning model. The routing container 126 may further determine whether the ranking serving container B 130 has loaded a copy of MegaCorp's opportunity ranking machine-learning model. If a copy of the extra identified machine-learning model is not loaded in the extra selected serving container, the method 300 continues to block 358 to load the extra identified machine-learning model in the extra selected serving container. If a copy of the extra identified machine-learning model is loaded in the extra selected serving container, the method 300 proceeds to block 360 to execute the extra identified machine-learning model in the extra selected serving container.

If a copy of the extra identified machine-learning model is not loaded in the extra selected serving container, a copy of the extra identified machine-learning model is optionally loaded in the extra selected serving container, box 358. The system can load a copy of the extra identified machine-learning model in the extra selected serving container. For example, and without limitation, this can include the scoring serving container E 148 loading a copy of MegaCorp's opportunity scoring machine-learning model E 161. Also, the recommending serving container B 136 may load a copy of MegaCorp's opportunity recommending machine-learning model, and the ranking serving container B 130 may load a copy of MegaCorp's opportunity ranking machine-learning model.

If a copy of the extra identified machine-learning model is loaded in the extra selected serving container, the extra identified machine-learning model is optionally executed in the extra selected serving container on behalf of the extra request, box 360. The system can execute a copy of the extra identified machine-learning model in the extra selected serving container. By way of example and without limitation, this can include a copy of MegaCorp's opportunity scoring machine-learning model E 161 scoring some purchasable business contacts as MegaCorp's business opportunities, after a copy of MegaCorp's opportunity scoring machine-learning model E 161 is verified as loaded in the scoring serving container E 148.

Also, a copy of MegaCorp's opportunity recommending machine-learning model may recommend some of the purchasable business contacts as MegaCorp's business opportunities to MegaCorp's sales representatives, after a copy of MegaCorp's opportunity recommending machine-learning model is verified as loaded in the recommending serving container B 136. Additionally, a copy of MegaCorp's opportunity ranking machine-learning model may rank the recommended business opportunities for each MegaCorp sales representative to determine their personal priorities for working on these business opportunities, after a copy of MegaCorp's opportunity ranking machine-learning model is verified as loaded in the ranking serving container B 130.

After executing an extra identified machine-learning model in an extra selected serving container on behalf of an extra request, the extra request is optionally responded to, based on executing a copy of the extra identified machine-learning model on behalf of the extra request, box 362. The system can respond to an extra request by executing a copy of any extra machine-learning model(s) in any extra serving container(s). In embodiments, this can include the machine-learning serving infrastructure 108 responding to Chris' request with each MegaCorp sales representative's priority-ranked list of recommended business opportunities.

The method 300 may be repeated as desired. Although this disclosure describes the blocks 302-362 executing in a particular order, the blocks 302-362 may be executed in a different order. In other implementations, each of the blocks 302-362 may also be executed in combination with other blocks and/or some blocks may be divided into a different set of blocks.

System Overview

Figure 4:
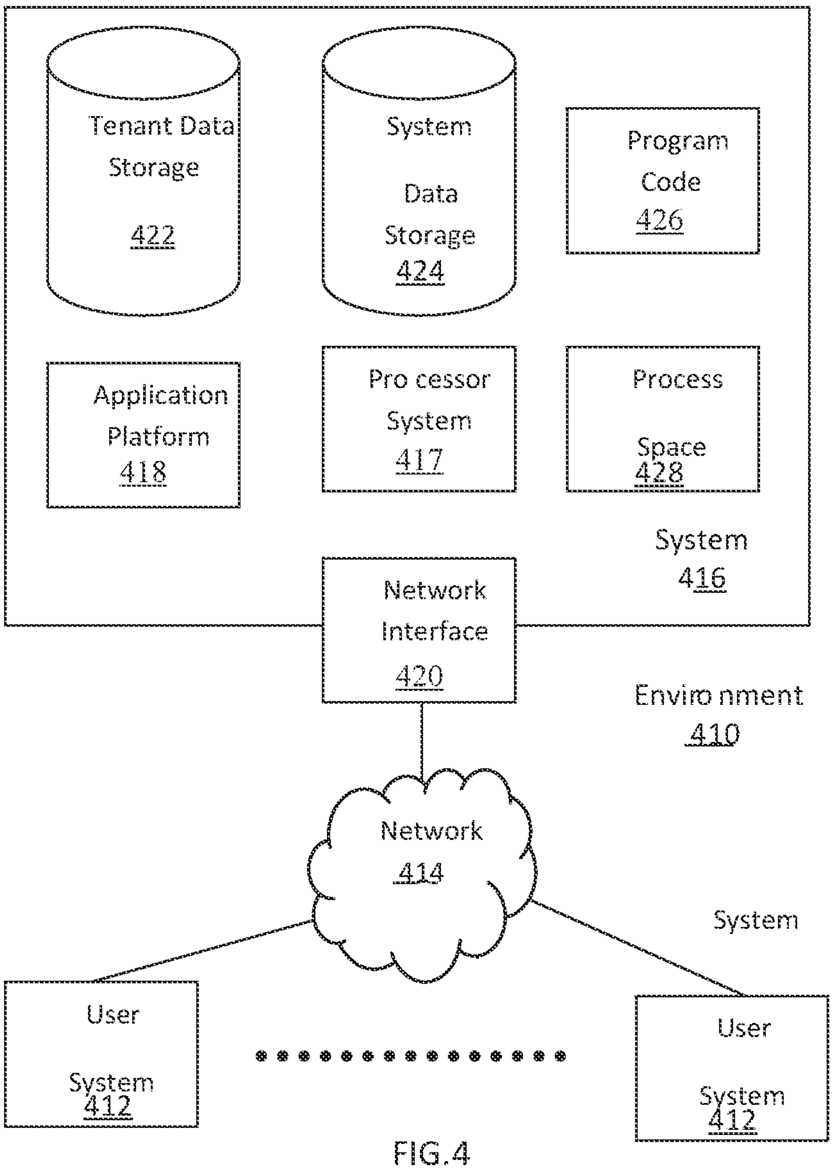
FIG. 4 illustrates a block diagram of an example of an environment wherein an on-demand database service might be used.

FIG. 4 illustrates a block diagram of an environment 410 wherein an on-demand database service might be used. The environment 410 may include user systems 412, a network 414, a system 416, a processor system 417, an application platform 418, a network interface 420, a tenant data storage 422, a system data storage 424, program code 426, and a process space 428. In other embodiments, the environment 410 may not have all the components listed and/or may have other elements instead of, or in addition to, those listed above.

The environment 410 is an environment in which an on-demand database service exists. A user system 412 may be any machine or system that is used by a user to access a database user system. For example, any of the user systems 412 may be a handheld computing device, a mobile phone, a laptop computer, a workstation, and/or a network of computing devices. As illustrated in FIG. 4 (and in more detail in FIG. 5) the user systems 412 might interact via the network 414 with an on-demand database service, which is the system 416.

An on-demand database service, such as the system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 416" and the "system 416" will be used interchangeably herein. A database image may include one or more database objects. A relational database management system (RDMS) or the equivalent may execute storage and retrieval of information against the database object(s). The application platform 418 may be a framework that allows the applications of the system 416 to run, such as the hardware and/or software, e.g., the operating system. In an embodiment, the on-demand database service 416 may include the application platform 418 which enables creation, managing and executing one or more applications developed by the provider of the on-demand database service, users accessing the on-demand database service via user systems 412, or third-party application developers accessing the on-demand database service via the user systems 412.

The users of the user systems 412 may differ in their respective capacities, and the capacity of a particular user system 412 might be entirely determined by permissions (permission levels) for the current user. For example, where a salesperson is using a particular user system 412 to interact with the system 416, that user system 412 has the capacities allotted to that salesperson. However, while an administrator is using that user system 412 to interact with the system 416, that user system 412 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 414 is any network or combination of networks of devices that communicate with one another. For example, the network 414 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, the networks that the one or more implementations might use are not so limited, although TCP/IP is a frequently implemented protocol.

The user systems 412 might communicate with the system 416 using TCP/IP and, at a higher network level, use other common Internet protocols to communicate, such as HTTP, FTP, AFS, WAP, etc. In an example where HTTP is used, the user systems 412 might include an HTTP client commonly referred to as a "browser" for sending and receiving HTTP messages to and from an HTTP server at the system 416. Such an HTTP server might be implemented as the sole network interface between the system 416 and the network 414, but other techniques might be used as well or instead. In some implementations, the interface between the system 416 and the network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 416, shown in FIG. 4, implements a web-based customer relationship management (CRM) system. For example, in one embodiment, the system 416 includes application servers configured to implement and execute CRM software applications as well as provide related data, code, forms, webpages and other information to and from the user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 416 implements applications other than, or in addition to, a CRM application. For example, the system 416 may provide tenant access to multiple hosted (standard and custom) applications, including a CRM application. User (or third-party developer) applications, which may or may not include CRM, may be supported by the application platform 418, which manages creation, storage of the applications into one or more database objects and executing of the applications in a virtual machine in the process space of the system 416.

One arrangement for elements of the system 416 is shown in FIG. 4, including the network interface 420, the application platform 418, the tenant data storage 422 for tenant data 423, the system data storage 424 for system data 425 accessible to the system 416 and possibly multiple tenants, the program code 426 for implementing various functions of the system 416, and the process space 428 for executing MTS system processes and tenant-specific processes, such as running applications as part of an application hosting service. Additional processes that may execute on the system 416 include database indexing processes.

Several elements in the system shown in FIG. 4 include conventional, well-known elements that are explained only briefly here. For example, each of the user systems 412 could include a desktop personal computer, workstation, laptop, PDA, cell phone, or any wireless access protocol (WAP) enabled device or any other computing device capable of interfacing directly or indirectly to the Internet or other network connection. Each of the user systems 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 412 to access, process and view information, pages, and applications available to it from the system 416 over the network 414. Each of the user systems 412 also typically includes one or more user interface devices, such as a keyboard, a mouse, trackball, touch pad, touch screen, pen, or the like, for interacting with a graphical user interface (GUI) provided by the browser on a display (e.g., a monitor screen, LCD display, etc.) in conjunction with pages, forms, applications, and other information provided by the system 416 or other systems or servers. For example, the user interface device may be used to access data and applications hosted by the system 416, and to perform searches on stored data, and otherwise allow a user to interact with various GUI pages that may be presented to a user. As discussed above, embodiments are suitable for use with the Internet, which refers to a specific global internetwork of networks. However, other networks may be used instead of the Internet, such as an intranet, an extranet, a virtual private network (VPN), a non-TCP/IP based network, any LAN or WAN or the like.

According to one embodiment, each of the user systems 412 and all its components are operator configurable using applications, such as a browser, including computer code run using a central processing unit such as an Intel Pentium® processor or the like. Similarly, the system 416 (and additional instances of an MTS, where more than one is present) and all their components might be operator configurable using application(s) including computer code to run using a central processing unit such as the processor system 417, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), micro-drive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 416 is configured to provide webpages, forms, applications, data, and media content to the user (client) systems 412 to support the access by the user systems 412 as tenants of the system 416. As such, the system 416 provides security mechanisms to keep each tenant's data separate unless the data is shared. If more than one MTS is used, they may be near one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 5:
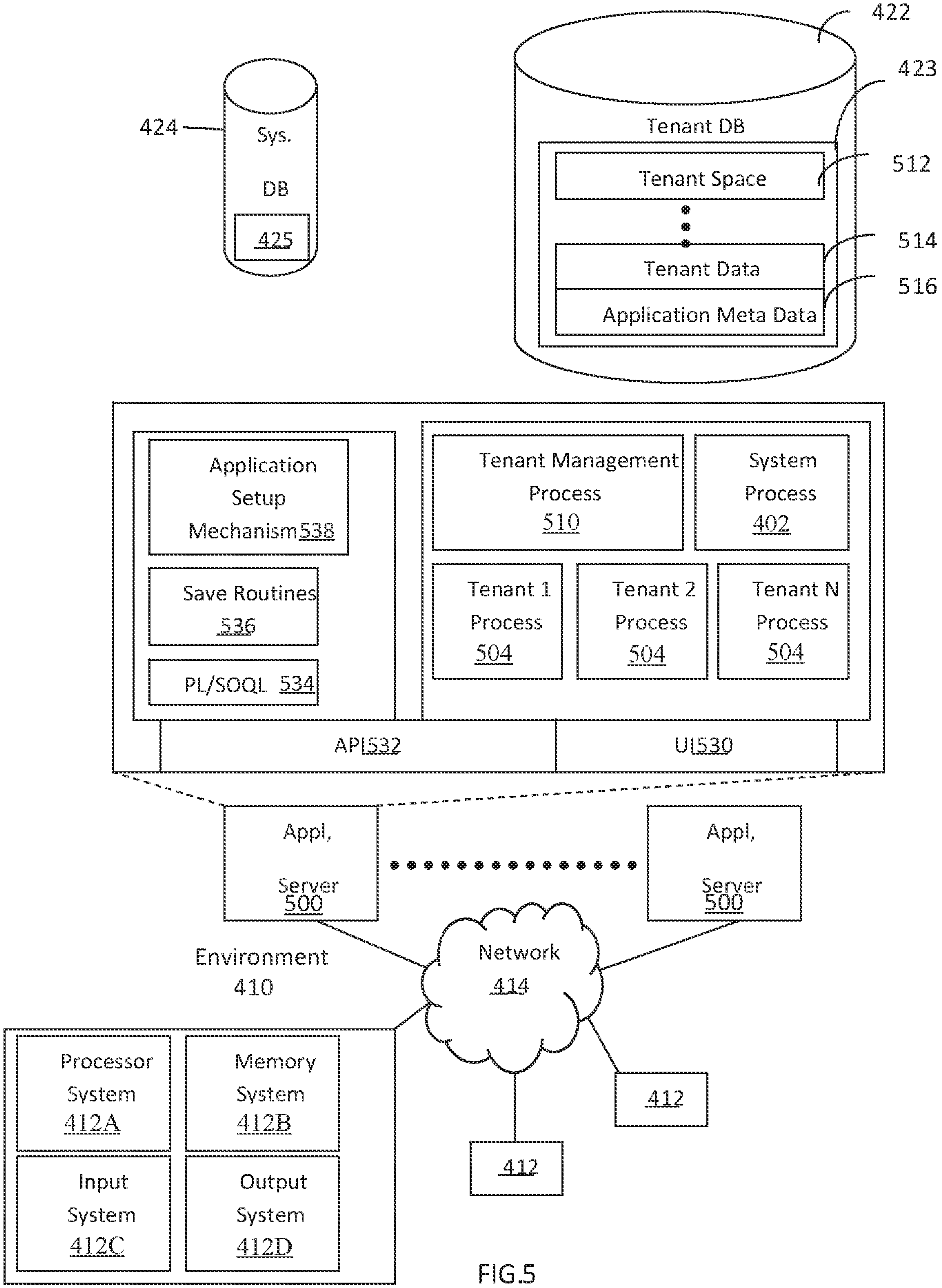
FIG. 5 illustrates a block diagram of an embodiment of elements of FIG. 4 and various possible interconnections between these elements.

FIG. 5 also illustrates the environment 410. However, in FIG. 5 elements of the system 416 and various interconnections in an embodiment are further illustrated. FIG. 5 shows that the each of the user systems 412 may include a processor system 412A, a memory system 412B, an input system 412C, and an output system 412D. FIG. 5 shows the network 414 and the system 416. FIG. 5 also shows that the system 416 may include the tenant data storage 422, the tenant data 423, the system data storage 424, the system data 425, a User Interface (UI) 530, an Application Program Interface (API) 532, a PL/SOQL 534, save routines 536, an application setup mechanism 538, applications servers $\mathbf{500}_1$-$\mathbf{500}_N$, a system process space 502, tenant process spaces 504, a tenant management process space 510, a tenant storage area 512, a user storage 514, and application metadata 516. In other embodiments, the environment 410 may not have the same elements as those listed above and/or may have other elements instead of, or in addition to, those listed above.

The user systems 412, the network 414, the system 416, the tenant data storage 422, and the system data storage 424 were discussed above in FIG. 4. Regarding the user systems 412, the processor system 412A may be any combination of one or more processors. The memory system 412B may be any combination of one or more memory devices, short-term, and/or long-term memory. The input system 412C may be any combination of input devices, such as one or more keyboards, mice, trackballs, scanners, cameras, and/or interfaces to networks. The output system 412D may be any combination of output devices, such as one or more monitors, printers, and/or interfaces to networks. As shown by FIG. 5, the system 416 may include the network interface 420 (of FIG. 4) implemented as a set of HTTP application servers 500, the application platform 418, the tenant data storage 422, and the system data storage 424. Also shown is the system process space 502, including individual tenant process spaces 504 and the tenant management process space 510. Each application server 500 may be configured to access tenant data storage 422 and the tenant data 423 therein, and the system data storage 424 and the system data 425 therein to serve requests of the user systems 412. The tenant data 423 might be divided into individual tenant storage areas 512, which may be either a physical arrangement and/or a logical arrangement of data. Within each tenant storage area 512, the user storage 514 and the application metadata 516 might be similarly allocated for each user. For example, a copy of a user's most recently used (MRU) items might be stored to the user storage 514. Similarly, a copy of MRU items for an entire organization that is a tenant might be stored to the tenant storage area 512. The UI 530 provides a user interface, and the API 532 provides an application programmer interface to the system 416 resident processes to users and/or developers at the user systems 412. The tenant data and the system data may be stored in various databases, such as one or more Oracle™ databases.

The application platform 418 includes the application setup mechanism 538 that supports application developers' creation and management of applications, which may be saved as metadata into the tenant data storage 422 by the save routines 536 for execution by subscribers as one or more tenant process spaces 504 managed by the tenant management process 510 for example. Invocations to such applications may be coded using the PL/SOQL 534 that provides a programming language style interface extension to the API 532. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 516 for the subscriber making the invocation and executing the metadata as an application in a virtual machine.

Each application server 500 may be communicably coupled to database systems, e.g., having access to the system data 425 and the tenant data 423, via a different network connection. For example, one application server $\mathbf{500}_1$ might be coupled via the network 414 (e.g., the Internet), another application server $\mathbf{500}_{N-1}$ might be coupled via a direct network link, and another application server $\mathbf{500}_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also may be used. For example, in certain embodiments, three consecutive requests from the same user could hit three different application servers 500, and three requests from different users could hit the same application server 500. In this manner, the system 416 is multi-tenant, wherein the system 416 handles storage of, and access to, different objects, data and applications across disparate users and organizations.

As an example of storage, one tenant might be a company that employs a sales force where each salesperson uses the system 416 to manage their sales process. Thus, a user might maintain contact data, leads data, customer follow-up data, performance data, goals, and progress data, etc., all applicable to that user's personal sales process (e.g., in the tenant data storage 422). In an example of a MTS arrangement, since all the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all the users for a given organization that is a tenant. Thus, there might be some data structures managed by the system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 416 might also maintain system level data usable by multiple tenants or other data. Such system level data might include industry reports, news, postings, and the like that are sharable among tenants.

In certain embodiments, the user systems 412 (which may be client systems) communicate with the application servers 500 to request and update system-level and tenant-level data from the system 416 that may require sending one or more queries to the tenant data storage 422 and/or the system data storage 424. The system 416 (e.g., an application server 500 in the system 416) automatically generates one or more SQL statements (e.g., one or more SQL queries) that are designed to access the desired information. The system data storage 424 may generate query plans to access the requested data from the database.

Each database can generally be viewed as a collection of objects, such as a set of logical tables, containing data fitted into predefined categories. A "table" is one representation of a data object and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. The word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation to encompass all such modifications and similar arrangements.

The invention claimed is:

1. A system for using container information to select containers for executing models, the system comprising:

one or more processors; and a non-transitory computer readable medium storing a plurality of instructions, which when executed, cause the one or more processors to:

watch, by a watcher associated with a routing container of a cluster of routing containers, for changes in available serving containers in a cluster of available serving containers associated with the routing container, wherein the changes include addition of one or more new serving containers to the cluster of available serving containers;

provide, by the watcher, information about the changes in the available serving containers to the routing container to update a mapping of the available serving containers based on the information;

identify a version of a machine-learning model associated with a request, in response to receiving the request from an application;

identify a set of available serving containers corresponding to the version of the machine-learning model from a cluster of available serving containers associated with the version of the machine-learning model, wherein the set of available serving containers is identified based, at least in part, on executing a hashing function applied to identifiers of the set of available serving containers, an identifier of any corresponding machine-learning model, and a replication factor for the version of the machine-learning model, wherein the replication factor identifies a number of serving containers of the set of available serving containers from the cluster of available serving containers for loading the version of the machine-learning model;

select an existing serving container and a new serving container from the set of available serving containers corresponding to the version of the machine-learning model;

load the version of the machine-learning model in the existing serving container, in response to a determination that the version of the machine-learning model is not loaded in the existing serving container;

execute, in the existing serving container, the machine-learning model on behalf of the request, in response to a determination that the machine-learning model is loaded in the existing serving container;

when the existing serving container is executing the version of the machine-learning model by another request, load another copy of the version of the machine-learning model into the new serving container and execute, in the new serving container, the version of the machine-learning model; and respond to the request based on executing the version of the machine-learning model on behalf of the request.

2. The system of claim 1, wherein selecting from any cluster of available serving containers is based on updating a data structure comprising container information associated with serving containers in any corresponding cluster of available serving containers.

3. The system of claim 1, comprising further instructions, which when executed, cause the one or more processors to:

identify an other version of an other machine-learning model associated with the request;

identify an other set of available serving containers corresponding to the other machine-learning model from an other cluster of available serving containers associated with the other version of the other machine-learning model;

select an other serving container from the other set of available serving containers corresponding to the other machine-learning model;

load the other machine-learning model in the other serving container, in response to a determination that the other machine-learning model is not loaded in the other serving container; and execute, in the other serving container, the other machine-learning model on behalf of the request, in response to a determination that the other machine-learning model is loaded in the other serving container;

wherein responding to the request is further based on executing the other machine-learning model on behalf of the request.

4. The system of claim 1, comprising further instructions, which when executed, cause the one or more processors to:

identify the version of the machine-learning model associated with an additional request, in response to receiving the additional request from the application;

identify the set of available serving containers corresponding to the machine-learning model from the cluster of available serving containers associated with the version of the machine-learning model;

select an additional serving container from the set of available serving containers corresponding to the machine-learning model;

load a copy of the machine-learning model in the additional serving container, in response to a determination that the copy of the machine-learning model is not loaded in the additional serving container;

execute, in the additional serving container, the copy of the machine-learning model on behalf of the additional request, in response to a determination that the copy of the machine-learning model is loaded in the additional serving container; and respond to the additional request based on executing the copy of the machine-learning model on behalf of the additional request.

5. The system of claim 1, comprising further instructions, which when executed, cause the one or more processors to:

identify an extra version of an extra machine-learning model associated with an extra request, in response to receiving the extra request from an extra application;

identify an extra set of available serving containers corresponding to the extra machine-learning model from the cluster of available serving containers which is associated with both the extra version of the extra machine-learning model and the version of the machine-learning model;

select an extra serving container from the extra set of available each serving containers container corresponding to the extra machine-learning model;

load the extra machine-learning model in the extra serving container, in response to a determination that the extra machine-learning model is not loaded in the extra serving container;

execute, in the extra serving container, the extra machine-learning model on behalf of the extra request, in response to a determination that the extra machine-learning model is loaded in the extra serving container; and respond to the extra request based on executing the extra machine-learning model on behalf of the extra request.

6. The system of claim 5, wherein the application is associated with a first tenant and the extra application is associated with a second tenant.

7. The system of claim 1, wherein any set of available serving containers corresponding to any machine-learning model is identified based on executing a consistent hashing function applied to identifiers of each serving container associated with any version of any corresponding machine-learning model and an identifier of any corresponding machine-learning model.

8. A computer program product comprising computer-readable program code to be executed by one or more processors when retrieved from a non-transitory computer-readable medium, the computer-readable program code including instructions to:

watch, by a watcher associated with a routing container of a cluster of routing containers, for changes in available serving containers in a cluster of available serving containers associated with the routing container, the changes include addition of one or more new serving containers to the cluster of available serving containers;

provide, by the watcher, information about the changes in the available serving containers to the routing container to update a mapping of the available serving containers based on the information;

identify a version of a machine-learning model associated with a request, in response to receiving the request from an application;

identify a set of available serving containers corresponding to the version of the machine-learning model from a cluster of available serving containers associated with the version of the machine-learning model, wherein the set of available serving containers is identified based, at least in part, on executing a hashing function applied to identifiers of the available serving containers, an identifier of any corresponding machine-learning model, and a replication factor for the version of the machine-learning model, wherein the replication factor identifies a number of serving containers of the set of available serving containers from the cluster of available serving containers for loading the version of the machine-learning model;

select an existing serving container and a new serving container from the set of available serving containers corresponding to the version of the machine-learning model;

load the version of the machine-learning model in the existing serving container, in response to a determination that the version of the machine-learning model is not loaded in the existing serving container;

execute, in the existing serving container, the machine-learning model on behalf of the request, in response to a determination that the machine-learning model is loaded in the existing serving container;

when the existing serving container is executing the version of the machine-learning model by another request, load another copy of the version of the machine-learning model into the new serving container and execute, in the new serving container, the version of the machine-learning model; and respond to the request based on executing version of the machine-learning model on behalf of the request.

9. The computer program product of claim 8, wherein selecting from any cluster of available serving containers is based on updating a data structure comprising container information associated with serving containers in any corresponding cluster of available serving containers.

10. The computer program product of claim 8, wherein the computer-readable program code comprises further instructions to:

identify an other version of an other machine-learning model associated with the request;

identify an other set of available serving containers corresponding to the other machine-learning model from an other cluster of available serving containers associated with the other version of the other machine-learning model;

select an other serving container from the other set of available serving containers corresponding to the other machine-learning model;

load the other machine-learning model in the other serving container, in response to a determination that the other machine-learning model is not loaded in the other serving container; and execute, in the other serving container, the other machine-learning model on behalf of the request, in response to a determination that the other machine-learning model is loaded in the other serving container;

wherein responding to the request is further based on executing the other machine-learning model on behalf of the request.

11. The computer program product of claim 8, wherein the computer-readable program code comprises further instructions to:

identify the version of the machine-learning model associated with an additional request, in response to receiving the additional request from the application;

identify the set of available serving containers corresponding to the machine-learning model from the cluster of available serving containers associated with the version of the machine-learning model;

select an additional serving container from the set of available serving containers corresponding to the machine-learning model;

load a copy of the machine-learning model in the additional serving container, in response to a determination that the copy of the machine-learning model is not loaded in the additional serving container;

execute, in the additional serving container, the copy of the machine-learning model on behalf of the additional request, in response to a determination that the copy of the machine-learning model is loaded in the additional serving container; and respond to the additional request based on executing the copy of the machine-learning model on behalf of the additional request.

12. The computer program product of claim 8, wherein the computer-readable program code comprises further instructions to:

identify an extra version of an extra machine-learning model associated with an extra request, in response to receiving the extra request from an extra application, wherein the application is associated with a first tenant and the extra application is associated with a second tenant;

identify an extra set of available serving containers corresponding to the extra machine-learning model from the cluster of available serving containers which is associated with both the extra version of the extra machine-learning model and the version of the machine-learning model;

select an extra serving container from the extra set of available serving containers corresponding to the extra machine-learning model;

load the extra machine-learning model in the extra serving container, in response to a determination that the extra machine-learning model is not loaded in the extra serving container;

execute, in the extra serving container, the extra machine-learning model on behalf of the extra request, in response to a determination that the extra machine-learning model is loaded in the extra serving container; and respond to the extra request based on executing the extra machine-learning model on behalf of the extra request.

13. The computer program product of claim 8, wherein any set of available serving containers corresponding to any machine-learning model is identified based on executing a consistent hashing function applied to identifiers of each serving container associated with any version of any corresponding machine-learning model and an identifier of any corresponding machine-learning model.

14. A computer-implemented method for using container information to select containers for executing models, the computer-implemented method comprising:

watching, by a watcher associated with a routing container of a cluster of routing containers, for changes in available serving containers in a cluster of available serving containers associated with the routing container, wherein the changes include addition of one or more new serving containers to the cluster of available serving containers;

providing, by the watcher, information about the changes in the available serving containers to the routing container to update a mapping of the available serving containers based on the information;

identifying a version of a machine-learning model associated with a request, in response to receiving the request from an application;

identifying a set of available serving containers corresponding to the version of the machine-learning model from a cluster of available serving containers associated with the version of the machine-learning model, wherein the set of available serving containers is identified based, at least in part, on executing a hashing function applied to identifiers of the available serving containers and an identifier of any corresponding machine-learning model, and a replication factor for the version of the machine-learning model, wherein the replication factor identifies a number of serving containers of the set of available serving containers from the cluster of available serving containers for loading the version of the machine-learning model;

selecting an existing serving container and a new serving container from the set of available serving containers corresponding to the version of the machine-learning model;

loading the version of the machine-learning model in the existing serving container, in response to a determination that the version of the machine-learning model is not loaded in the existing serving container;

executing, in the existing serving container, the machine-learning model on behalf of the request, in response to a determination that the machine-learning model is loaded in the existing serving container;

when the existing serving container is executing the version of the machine-learning model by another request, loading another copy of the version of the machine-learning model into the new serving container and executing, in the new serving container, the version of the machine-learning model; and responding to the request based on executing the version of the machine-learning model on behalf of the request.

15. The computer-implemented method of claim 14, wherein selecting from any cluster of available serving containers is based on updating a data structure comprising container information associated with available serving containers in any corresponding cluster of available serving containers.

16. The computer-implemented method of claim 14, the computer-implemented method further comprising:

identifying an other version of an other machine-learning model associated with the request;

identifying an other set of available serving containers corresponding to the other machine-learning model from an other cluster of available serving containers associated with the other version of the other machine-learning model;

selecting an other serving container from the other set of available serving containers corresponding to the other machine-learning model;

loading the other machine-learning model in the other serving container, in response to a determination that the other machine-learning model is not loaded in the other serving container; and executing, in the other serving container, the other machine-learning model on behalf of the request, in response to a determination that the other machine-learning model is loaded in the other serving container;

wherein responding to the request is further based on executing the other machine-learning model on behalf of the request.

17. The computer-implemented method of claim 14, the computer-implemented method further comprising:

identifying the version of the machine-learning model associated with an additional request, in response to receiving the additional request from the application;

identifying the set of available serving containers corresponding to the machine-learning model from the cluster of available serving containers associated with the version of the machine-learning model;

selecting an additional serving container from the set of available serving containers corresponding to the machine-learning model;

loading a copy of the machine-learning model in the additional serving container, in response to a determination that the copy of the machine-learning model is not loaded in the additional serving container;

executing, in the additional serving container, the copy of the machine-learning model on behalf of the additional request, in response to a determination that the copy of the machine-learning model is loaded in the additional serving container; and responding to the additional request based on executing the copy of the machine-learning model on behalf of the additional request.

18. The computer-implemented method of claim 14, the computer-implemented method further comprising:

identifying an extra version of an extra machine-learning model associated with an extra request, in response to receiving the extra request from an extra application;

identifying an extra set of available serving containers corresponding to the extra machine-learning model from the cluster of available serving containers which is associated with both the extra version of the extra machine-learning model and the version of the machine-learning model;

selecting an extra serving container from the extra set of available serving containers corresponding to the extra machine-learning model;

loading the extra machine-learning model in the extra serving container, in response to a determination that the extra machine-learning model is not loaded in the extra serving container;

executing, in the extra serving container, the extra machine-learning model on behalf of the extra request, in response to a determination that the extra machine-learning model is loaded in the extra serving container; and responding to the extra request based on executing the extra machine-learning model on behalf of the extra request.

19. The computer-implemented method of claim 18, wherein the application is associated with a first tenant and the extra application is associated with a second tenant.

20. The computer-implemented method of claim 14, wherein any set of available serving containers corresponding to any machine-learning model is identified based on executing a consistent hashing function applied to identifiers of each serving container associated with any version of any corresponding machine-learning model and an identifier of any corresponding machine-learning model.

* * * * *